United States Patent
Nishikawa et al.

(10) Patent No.: US 7,638,563 B2
(45) Date of Patent: Dec. 29, 2009

(54) POLYCARBOXYLIC ACID CONCRETE ADMIXTURE

(75) Inventors: Tomotaka Nishikawa, Osaka (JP); Toru Uno, Yokohama (JP); Hirokazu Yamamoto, Kanagawa (JP); Yukiko Nishikawa, Kanagawa (JP); Hiromichi Tanaka, Kanagawa (JP); Tomiyasu Ueta, Osaka (JP)

(73) Assignee: Nippon Shokubai Co., Ltd., Osaka-shi (JP)

( * ) Notice: Subject to any disclaimer, the term of this patent is extended or adjusted under 35 U.S.C. 154(b) by 364 days.

(21) Appl. No.: 10/556,086

(22) PCT Filed: May 7, 2004

(86) PCT No.: PCT/JP2004/006475

§ 371 (c)(1),
(2), (4) Date: Jul. 17, 2006

(87) PCT Pub. No.: WO2004/099099

PCT Pub. Date: Nov. 18, 2004

(65) Prior Publication Data

US 2008/0027177 A1 Jan. 31, 2008

(30) Foreign Application Priority Data

May 9, 2003 (JP) .............................. 2003-132287

(51) Int. Cl.
*C04B 24/26* (2006.01)
*C08F 30/04* (2006.01)
*C08F 20/26* (2006.01)
*C08F 20/10* (2006.01)
*C08F 18/00* (2006.01)

(52) U.S. Cl. ..................... 524/5; 526/240; 526/318.42; 526/318.41; 526/320

(58) Field of Classification Search ...................... 524/5; 526/240, 318.42, 318.41, 320
See application file for complete search history.

(56) References Cited

U.S. PATENT DOCUMENTS 5,362,829 A   11/1994  Kinoshita et al.
5,466,289 A   11/1995  Yonezawa et al.
5,911,820 A    6/1999  Satoh et al.
6,140,440 A *  10/2000  Kinoshita et al. ........ 526/318.4
6,228,962 B1   5/2001  Kinoshita et al.
7,125,944 B2* 10/2006  Yamashita et al. ..... 526/318.42

FOREIGN PATENT DOCUMENTS

| EP | 1103570 A2 | 5/2001 |
|---|---|---|
| JP | 05-213653 A | 8/1993 |
| JP | 06-191918 A | 7/1994 |
| JP | 06-206750 A | 7/1994 |
| JP | 08-109057 A | 4/1996 |
| JP | 08-290955 A | 11/1996 |
| JP | 09-227205 A | 9/1997 |
| JP | 10-081549 A | 3/1998 |
| JP | 11-060305 A | 3/1999 |
| JP | 11-171619 A | 6/1999 |
| JP | 2000-233956 A | 8/2000 |
| JP | 2000-290056 A | 10/2000 |
| JP | 2001-146447 A | 5/2001 |
| JP | 2001-294463 A | 10/2001 |
| JP | 2002-053358 A | 2/2002 |
| JP | 2003-286057 A | 10/2003 |
| JP | 2003-286058 A | 10/2003 |
| WO | WO-02/096823 A1 | 12/2002 |

* cited by examiner

*Primary Examiner*—Ling-Siu Choi
*Assistant Examiner*—Hui Chin
(74) *Attorney, Agent, or Firm*—Connolly Bove Lodge & Hutz LLP

(57) ABSTRACT

The polycarboxylic acid concrete admixture of the present invention exhibits properties such as decreasing the concrete viscosity, improving the slump-retaining ability, and suppressing bleeding water, and is improved in the ability to cement compositions or the like. The above-mentioned polycarboxylic acid concrete admixture comprises a polycarboxylic acid polymer containing a polyalkylene glycol in the side chain, wherein the polycarboxylic acid polymer is obtained by polymerizing monomer components containing an alkyl (meth)acrylate monomer and a specific polyalkylene glycol unsaturated monomer and unsaturated carboxylic acid (salt) monomer, and it has a specific weight average molecular weight.

10 Claims, No Drawings

POLYCARBOXYLIC ACID CONCRETE ADMIXTURE

This application is a National Stage of PCT/JP2004/006475 filed May 7, 2004 which in turn claims priority from Japanese Application 2003-132287, filed May 9, 2003.

TECHNICAL FIELD

The present invention-relates to a polycarboxylic acid concrete admixture, and a cement composition. More particularly, it relates to a polycarboxylic acid concrete admixture that can be applied as a water-reducing agent and the like for improving the fluidity for cement compositions and the like, and a cement composition comprising the same.

BACKGROUND ART

Concrete admixtures have been widely used for cement compositions such as cement paste, mortar and concrete as a water-reducing agent and the like. They are now essential in constructing civil engineering and building structures and the like from cement compositions. Such concrete admixtures increase the fluidity of cement compositions to thereby reduce the water requirement of the cement compositions, and therefore are effective in improving the strength, durability and the like, of hardened (cured) products. Among such water reducing agents, polycarboxylic acid concrete admixtures comprising a polycarboxylic acid polymer exhibit superior water-reducing performance to naphthalene and other conventional water reducing agents, thus have already led to good results in many cases as air-entraining and high-range water-reducing admixture.

With respect to conventional concrete admixtures, the following documents have been disclosed.

Japanese Kokai Publication Hei-10-081549 discloses a concrete admixture comprising a copolymer having the alkylene oxide chain length of 25 to 300 moles. Japanese Kokai Publication 2000-233956 discloses a cement dispersant containing, as a main component, a copolymer obtained by copolymerizing 5 to 35 mole % of alkyl (meth)acrylate and having the alkylene oxide chain length of 5 to 40 moles and the weight average molecular weight of 20000 to 80000.

Japanese Kokai Publication Hei-05-213653, Hei-06-191918, Hei-06-206750, Hei-08-109057, Hei-08-290955, Hei-09-227205 and Hei-11-171619 disclose cement dispersants comprising water-soluble vinyl copolymers having copolymerization ratios of alkyl (meth)acrylate in a range of 0 to 20 mole %. Among these, in particular, Japanese Kokai Publication Hei-09-227205 discloses a copolymer of phenoxymethacrylate having the polyethylene glycol chain length of 15 and 25 mole % of methyl acrylate.

Japanese Kokai Publication 2000-290056 discloses hydraulic compositions obtained by combinedly using a material segregation reducing agent having no dispersing ability (dispersibility) which comprises a (meth)acrylic acid polymer containing a hydrocarbon group with not less than 4 carbon atoms and a polyoxyalkylene chain, and a high-range water-reducing admixture. Japanese Kokai Publication 2002-053358 discloses a ternary polymer comprising polyalkylene glycol monoacrylate/alkyl (meth)acrylate (the number of carbon atoms of an alkyl group: 5 to 30)/(meth)acrylic acid. Furthermore, European Patent Publication No. 1103570 discloses a copolymer for cement admixtures comprising a constitutional unit derived from an unsaturated polyalkylene glycol ether monomer and a constitutional unit derived from an unsaturated monocarboxylic acid monomer as essential constitutional units. International Publication WO 02/096823 discloses a cement admixture comprising two polymers, namely a polymer (A1) comprising a constituent unit derived from an unsaturated (poly)alkylene glycol ether monomer and a constituent unit derived from an unsaturated monocarboxylic acid monomer, and an oxyalkylene group- or polyoxyalkylene group- and carboxyl group-containing polymer (B1).

However, there was a room for contrivance in order to improve of these concrete admixtures so as to simultaneously satisfy the properties such as decreasing the concrete viscosity, improvement of slump-retaining ability and suppression of bleeding water required for the cement compositions. By satisfying all these properties, the workability of cement compositions becomes excellent; the working efficiency in construction sites for civil engineering, building construction and the like can be improved; and the abilities to improve the strength and the durability of hardened products, which are required for concrete admixtures, can sufficiently be exhibited. Accordingly, concrete admixtures satisfying these properties have been highly desired.

SUMMARY OF THE INVENTION

The present invention has been made in view of the above-mentioned state of the art, and has for its object to provide a polycarboxylic acid concrete admixture which exhibits properties such as decreasing the concrete viscosity, improving the slump-retaining ability, and suppressing bleeding water, and is improved in the ability to cement compositions or the like, and a cement composition comprising the polycarboxylic acid concrete admixture.

In the course of investigations made by them in search of concrete admixtures, the present inventors paid attention to the fact that a concrete admixture comprising a polycarboxylic acid polymer containing a polyalkylene glycol in the side chain can exhibit excellent water-reducing ability for cement compositions and that a polymer obtained by polymerizing monomer components containing an alkyl (meth)acrylate monomer with high hydrophobicity together with a polyalkylene glycol unsaturated monomer and an unsaturated carboxylic acid (salt) monomer is preferable as such a polycarboxylic acid polymer. And the above-mentioned problems can successfully be solved by optimizing the polymerization ratio of these monomers, specifying a structure of the polyalkylene glycol unsaturated monomer, and specifying the weight average molecular weight of the polymer. Such findings have now led to completion of the present invention. A concrete using this concrete admixture is found being improved in the decrease of the viscosity, slump-retaining ability and bleeding water suppression, and these excellent properties are all satisfied.

The polycarboxylic acid concrete admixture of the present invention is also useful in the form of a blend mixed with other admixtures. In the case the concrete admixture is used in combination with an admixture with high water-reducing ability, for example, one having a long polyalkylene glycol chain length, the effects of the present invention can be exhibited together with the excellent water-reducing ability; thus, the resulting admixture blend can work efficiently for cement compositions or the like.

Therefore, the present invention is a concrete admixture comprising a polycarboxylic acid polymer containing a polyalkylene glycol in the side chain, wherein said polycarboxylic acid polymer is formed by polymerizing monomer components comprising 20 to 60 mole % of at least one alkyl (meth)acrylate monomer selected from the group consisting of methyl(meth)acrylate, ethyl (meth)acrylate, propyl(meth)acrylate and butyl(meth)acrylate, 15 to 40 mole % of a polyalkylene glycol unsaturated monomer represented by the following formula (1);

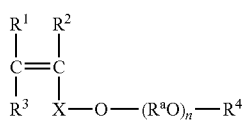 (1)

(wherein $R^1$, $R^2$ and $R^3$ may be the same or different and each represents a hydrogen atom or a methyl group; $R^4$ represents a hydrogen atom or a hydrocarbon group (a saturated alkyl group or an unsaturated alkyl group) containing 1 to 20 carbon atoms; $R^a$ may be the same or different and represents an alkylene group containing 2 to 18 carbon atoms; n represents an average molar number of addition of the oxyalkylene group represented by $R^aO$ and is a number of 1 to 300; X represents a divalent alkylene group containing 1 to 5 carbon atoms or represents that the carbon atom and oxygen atom bonded to X are directly bonded to each other in case of the group represented by $R^1R^3C=CR^2X$— is a vinyl group, and X may be a —CO— bond), and 19 to 65 mole % of an unsaturated carboxylic acid (salt) monomer, and has a weight average molecular weight of 20000 or less.

The present invention is also a cement composition containing the above-mentioned polycarboxylic acid concrete admixture.

DISCLOSURE OF THE INVENTION

In the following, the present invention is described in detail.

A polycarboxylic acid concrete admixture of the present invention comprises a polycarboxylic acid polymer obtained by polymerizing monomer components containing at least three species of monomers, that is, an alkyl (meth)acrylate monomer, a polyalkylene glycol unsaturated monomer and an unsaturated carboxylic acid (salt) monomer. Such a polymer may also be referred to as a ternary copolymer; however, other monomers may be copolymerized as long as the above-mentioned three species of monomers are copolymerized. The polymer is not particularly limited to the ternary copolymer, and an alkyl (meth)acrylate monomer differing from the above-mentioned alkyl (meth)acrylate monomer and also a monomer copolymerizable with a monomer other than the above-mentioned three species of monomers may be added. The above-mentioned respective monomers may be used singly or two or more of them may be used in combination. In the case that other monomers are copolymerized, it is preferable that the above-mentioned three species of the monomers are main components in the monomer components. The polycarboxylic acid polymer comprising such monomer components is a polymer having a side chain with a structure in which polyalkylene glycol is bonded to the main chain, namely a polymer containing a polyalkylene glycol in the side chain. The side chain is essentially formed from the polyalkylene glycol unsaturated monomer.

Incidentally, "a polycarboxylic acid concrete admixture" means a composition for using as a cement admixture comprising a polycarboxylic acid or an analogous compound thereof such as the polymer described in this description, for example a derivative or a polycarboxylic acid salt. The present invention may suitably comprise, consist of, or consist essentially of a polycarboxylic acid polymer containing a polyalkylene glycol in the side chain.

The above-mentioned polycarboxylic acid polymer is obtained by polymerizing monomer components comprising 20 to 60 mole % of the alkyl (meth)acrylate monomer, 15 to 40 mole % of the polyalkylene glycol unsaturated monomer, and 19 to 65 mole % of the unsaturated carboxylic acid (salt) monomer. With respect to the polymer produced from these monomer components, owing to the monomer unit formed from the polyalkylene glycol unsaturated monomer, the function of exhibiting the dispersing ability of cement compositions derived from hydrophilicity and steric hindrance of the polyalkylene glycol can be obtained. Furthermore, owing to the monomer units formed from the unsaturated carboxylic acid (salt) monomer, the function of adsorbing the above-mentioned polymer to cement particles is provided. And, owing to comprising the monomer unit formed by the alkyl (meth)acrylate monomer with high hydrophobicity and specifying the copolymerization ratio of these monomers as above, the effects of the present invention can be exhibited.

In the above-mentioned monomer components, the ratio of the alkyl (meth)acrylate monomer is 20 to 60 mole %. If the ratio of the alkyl (meth)acrylate monomer is less than 20 mole %, the viscosity of cement compositions may not be sufficiently decreased. It is preferably 22 to 55 mole %. The ratio of the polyalkylene glycol unsaturated monomer is 15 to 40 mole %, but it is preferably 18 to 35 mole %. The ratio of the unsaturated carboxylic acid (salt) monomer is 19 to 65 mole %, but it is preferably 30 to 60 mole %. Furthermore, in the case where the fourth component is contained besides the above-mentioned alkyl (meth)acrylate monomer, polyalkylene glycol unsaturated monomer, and unsaturated carboxylic acid (salt) monomer, the ratio thereof is preferably in a range of 0 to 30 mole %. These "mole % (percent)" values are those calculated on the basis of 100 mole % of the total of the alkyl (meth)acrylate monomer, polyalkylene glycol unsaturated monomer, unsaturated carboxylic acid (salt) monomer and the fourth component.

The polyalkylene glycol unsaturated monomer constituting the above-mentioned monomer components has the polyalkylene glycol chain length of not more than 25 mole. The polyalkylene glycol chain has a structure in which an oxyalkylene group is added to an alcohol, and the average molar number of addition of the oxyalkylene group expresses the polyalkylene glycol chain length. The average molar number of addition of the oxyalkylene group means the average value for the molar number of the oxyalkylene group in question added in each mole of the group formed by the oxyalkylene group contained in said monomer. Such polyalkylene glycol chain length is preferably not less than 6 moles and not more than 20 moles in order to sufficiently provide the function of the monomer unit formed from the polyalkylene glycol unsaturated monomer with high hydrophobicity.

The weight average molecular weight of the above-mentioned polycarboxylic acid polymer is preferably not more than 20000. When it exceeds 20000, slump-retaining ability of the cement composition may not be sufficiently improved, and the cement composition may not be provided sufficient handling easiness. It is preferably 4000 to 18000, more preferably 5000 to 14000, and still more preferably 6000 to 12000.

The weight average molecular weight of the polymer is the weight average molecular weight as determined by gel permeation chromatography (hereinafter referred to as "GPC") and expressed on the polyethylene glycol equivalent. It is preferable to determine by the following GPC measurement conditions.

GPC Molecular Weight Measurement Conditions

Column used: Tosoh TSK guard column SWXL+TSK gel G4000SWXL+G3000SWXL+G2000SWXL

Eluent: Sodium acetate trihydrate (115.6 g) is dissolved in a mixed solvent composed of 10999 g of water and 6001 g of acetonitrile, and the solution is further adjusted to pH 6.0 with acetic acid and used as the solution of the eluent.

Injection volume: 100 µL of the 0.5% solution of the eluent

Eluent flow rate: 0.8 mL/min

Column temperature: 40° C.

Standard samples: Polyethylene glycol, peak-top molecular weights (Mp) 272500, 219300, 85000, 46000, 24000, 12600, 4250, 7100, 1470

Order of Calibration curve: 3rd-order

Detector: Waters, Japan's 410 differential refractive index detector

Analysis software: Waters, Japan's MILLENNIUM Ver. 3.21

As the method of using the polycarboxylic acid concrete admixture of the present invention, one species of the concrete admixture may be added to a cement composition or two or more species of the concrete admixture may be added to a cement composition. For example, the concrete admixture is preferably used in combination with an admixture with high water-reducing ability. In this case, as the concrete admixture of the present invention, those with high water-reducing ability and low water-reducing ability may be used in combination, or the concrete admixture of the present invention and other concrete admixture with high water-reducing ability may be used in combination. As the concrete admixtures with high water-reducing ability, for example, preferred are an admixture essentially comprising a polycarboxylic acid polymer containing the long polyalkylene glycol chain length, and an admixture essentially comprising a polycarboxylic acid polymer (the polyalkylene glycol chain length of not less than 6 moles) with low (meth)acrylate content. As the monomer components for forming the polycarboxylic acid polymer, those comprising a polyalkylene glycol unsaturated monomer and an unsaturated carboxylic acid (salt) monomer as essential components are preferred. The polyalkylene glycol chain length is preferably not less than 6 moles in the case no (meth)acrylate is contained. More preferably, it is 10 to 200 moles, and still more preferably 10 to 100 moles. The polyalkylene glycol chain length is preferably not less than 10 moles in the case (meth)acrylate is contained. More preferably, it is not less than 25 moles, still more preferably 25 to 200 moles, and especially preferably 25 to 100 moles.

In the following, the monomer components, the production method of the polycarboxylic acid polymer, the polycarboxylic acid concrete admixture and the like according to the present invention are described in detail.

The alkyl (meth)acrylate monomer of the present invention is at least one species of alkyl (meth)acrylate monomer selected from the group consisting of methyl (meth)acrylate, ethyl (meth)acrylate, propyl (meth)acrylate and butyl (meth) acrylate. One or two or more species of these may be used. Among them, methyl (meth)acrylate is preferred.

The polyalkylene glycol unsaturated monomer of the present invention contains a polymerizable unsaturated group and a polyalkylene glycol chain, and is represented by the following formula (1).

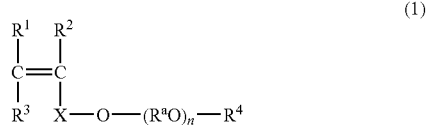

In the above formula (1), $R^1$, $R^2$ and $R^3$ may be the same or different and each represents a hydrogen atom or a methyl group. $R^4$ represents a hydrogen atom or a hydrocarbon group (a saturated alkyl group or an unsaturated alkyl group) containing 1 to 20 carbon atoms. $R^a$ may be the same or different and represents an alkylene group containing 2 to 18 carbon atoms, and n represents an average molar number of addition of the oxyalkylene group represented by $R^aO$ and is a number of 1 to 300. X represents a divalent alkylene group containing 1 to 5 carbon atoms or represents that the carbon atom and oxygen atom bonded to X are directly bonded to each other in case of the group represented by $R^1R^3C=CR^2X-$ is a vinyl group. X may also be a —CO— bond.

As the compound represented by the above formula (1), there may be mentioned, for example, an unsaturated alcohol-polyalkylene glycol adduct and a polyalkylene glycol ester monomer.

The unsaturated alcohol-polyalkylene glycol adduct may be any compounds that have a structure in which a polyalkylene glycol chain is added to an alcohol containing an unsaturated group. The polyalkylene glycol ester monomer may be any of monomers that have a structure in which an unsaturated group is bonded to a polyalkylene glycol chain via an ester bond. Preferred is an unsaturated carboxylic acid polyalkylene glycol ester compound, and particularly preferred is (alkoxy)polyalkylene glycol mono(meth)acrylate.

In the cases where two or more species of oxyalkylene groups represented by $-(R^aO)-$ in the above formula (1) occur in the same polyalkylene glycol unsaturated monomer, the oxyalkylene group represented by $-(R^aO)-$ may be in any addition mode, namely random addition, block addition, alternate addition or the like.

The oxyalkylene group represented by $-(R^aO)-$ as mentioned above is an alkylene oxide adduct containing 2 to 18 carbon atoms. Such alkylene oxide adduct has a structure formed by one or two or more species of alkylene oxides such as ethylene oxide, propylene oxide, butylene oxide, isobutylene oxide, 1-butene oxide and 2-butene oxide. Among such alkylene oxide adducts, ethylene oxide, propylene oxide and butylene oxide adducts are preferred. Still more preferably, it is mainly formed of ethylene oxide.

The oxyalkylene group represented by $R^aO$ as mentioned above is preferably a group mainly formed of an oxyethylene group. In this case, "mainly" means that the oxyethylene group accounts for a majority relative to the number of all the oxyalkylene groups occurring. When the oxyethylene group accounts for "a majority", in the above sense, of the above oxyalkylene groups, the proportion thereof as expressed in terms of mole % relative to 100 mole % of all the oxyalkylene groups is preferably 50 to 100 mole %. If it is less than 50 mole %, the hydrophilicity of the oxyalkylene groups may possibly become insufficient to decrease dispersing ability of cement particles. More preferably, it is not less than 60 mole %, still more preferably not less than 70 mole %, especially preferably not less than 80 mole %, and most preferably not less than 90 mole %.

In the case that the compound represented by the above formula (1) is a polyalkylene glycol ester monomer, as for the oxyalkylene group represented by —(R$^a$O)$_n$—, it is preferable that the ethylene oxide site is added to the site of the ester bond with (meth)acrylic acid monomer (R$^1$R$^3$C=CR$^2$—COOH) from the viewpoint of esterification productivity improvement with (meth)acrylic acid monomer.

The average molar number n of addition of oxyalkylene groups represented by the above R$^a$O is a number of 1 to 25. The range of n and the average molar number of addition of the oxyethylene group(s) in —(R$^a$O)$_n$— is preferably not less than 2. When n is less than the above molar number, sufficient levels of steric hindrance to disperse cement particles or the like may not be obtained. When the average molar number of addition of the oxyethylene group(s) is less than the above molar number, sufficient levels of hydrophilicity to disperse cement particles or the like may not be obtained. The upper limit of n and the average molar number of addition of the oxyethylene group(s) is preferably not more than 24, more preferably not more than 20, and still more preferably not more than 15. The range of n and the range of the average molar number of addition of the oxyethylene group(s) in —(R$^a$O)$_n$— is preferably 2 to 25. More preferably, they are 2 to 24.

It is possible to use, as the polyalkylene glycol unsaturated monomer, a combination of two or more monomer species differing in the average molar number n of addition of the oxyalkylene group(s). As a suitable combination, for example, a combination of two species of the polyalkylene glycol unsaturated monomer differing in the average molar number n of addition by not more than 5 (preferably a difference in n by not more than 3), a combination of two monomer species differing in the average molar number n of addition by not less than 5 (preferably a difference in n by not less than 10), or a combination of not less than three monomer species differing in n by not less than 5 from one another. Furthermore, as for the range of n for combined use, it is possible to combine a monomer having an average molar number n of addition in the range of 20 to 25 with a monomer having the range of 1 to 20 (the difference in n being not less than 10, and preferably not less than 20).

The above R$^4$ represents a hydrogen atom or a hydrocarbon group (a saturated alkyl group or an unsaturated alkyl group) containing 1 to 20 carbon atoms. If the number of carbon atoms exceeds 30, the hydrophobicity of the concrete admixture of the present invention becomes excessively strong, so that good dispersing ability cannot be obtained. From the dispersing ability viewpoint, a preferred embodiment of R$^4$ is a hydrocarbon group containing 1 to 20 carbon atoms or hydrogen, more preferably a hydrocarbon group containing not more than 10 carbon atoms, still more preferably not more than 5 carbon atoms, further still more preferably not more than 3 carbon atoms, and especially preferably not more than 2 carbon atoms. Additionally, the hydrocarbon group is suitably a saturated alkyl group or an unsaturated alkyl group. These alkyl groups may be straight chained or branched. For attaining excellent segregation preventing capacity and rendering the air amount entrained into cement compositions adequate, a hydrocarbon group containing not less than 5 carbon atoms is preferred, and a hydrocarbon group containing not more than 20 carbon atoms is preferred. More preferred is a hydrocarbon group containing 5 to 10 carbon atoms. Among the hydrocarbon groups, a saturated alkyl group and an unsaturated alkyl group are preferred. These alkyl groups may be straight chained or branched.

Suitable as the above-mentioned unsaturated alcohol-polyalkylene glycol adduct are, for example, a vinyl alcohol-alkylene oxide adduct, (meth)allyl alcohol-alkylene oxide adduct, 3-buten-1-ol-alkylene oxide adduct, isoprene alcohol (3-methyl-3-buten-1-ol)-alkylene oxide adduct, 3-methyl-2-buten-1-ol-alkylene oxide adduct, 2-methyl-3-buten-2-ol-alkylene oxide adduct, 2-methyl-2-buten-1-ol-alkylene oxide adduct, 2-methyl-3-buten-1-ol-alkylene oxide adduct and the like.

Suitable as the above-mentioned unsaturated alcohol-polyalkylene glycol adduct are also polyethylene glycol monovinyl ether, polyethylene glycol monoallyl ether, polyethylene glycol mono(2-methyl-2-propenyl) ether, polyethylene glycol mono(2-butenyl) ether, polyethylene glycol mono(3-methyl-3-butenyl) ether, polyethylene glycol mono(3-methyl-2-butenyl) ether, polyethylene glycol mono(2-methyl-3-butenyl) ether, polyethylene glycol mono(2-methyl-2-butenyl) ether, polyethylene glycol mono(1,1-dimethyl-2-propenyl)ether, polyethylene-polypropylene glycol mono(3-methyl-3-butenyl) ether, methoxypolyethylene glycol mono(3-methyl-3-butenyl) ether, ethoxypolyethylene glycol mono(3-methyl-3-butenyl) ether, 1-propoxypolyethylene glycol mono(3-methyl-3-butenyl) ether, cyclohexyloxypolyethylene glycol mono(3-methyl-3-butenyl) ether, 1-octyloxypolyethylene glycol mono(3-methyl-3-butenyl) ether, nonylalkoxypolyethylene glycol mono(3-methyl-3-butenyl) ether, laurylalkoxypolyethylene glycol mono(3-methyl-3-butenyl) ether, stearylalkoxypolyethylene glycol mono(3-methyl-3-butenyl) ether, phenoxypolyethylene glycol mono(3-methyl-3-butenyl) ether, naphthoxypolyethylene glycol mono(3-methyl-3-butenyl) ether, methoxypolyethylene glycol monoallyl ether, ethoxypolyethylene glycol monoallyl ether, phenoxypolyethylene glycol monoallyl ether, methoxypolyethylene glycol mono(2-methyl-2-propenyl) ether, ethoxypolyethylene glycol mono(2-methyl-2-propenyl) ether, phenoxypolyethylene glycol mono(2-methyl-2-propenyl) ether and the like.

As the above-mentioned (alkoxy)polyalkylene glycol mono(meth)acrylate, those mentioned above may be used, and preferable examples thereof include esterification products of (meth)acrylic acid with alkoxypolyalkylene glycols, especially preferably alkoxypolyalkylene glycols which are mainly formed of an ethylene oxide group(s), obtained by adding 1 to 25 moles of an alkylene oxide group(s) containing 2 to 18 carbon atoms to any of aliphatic alcohols containing 1 to 30 carbon atoms such as methanol, ethanol, 1-propanol, 2-propanol, 1-butanol, 2-butanol, 1-pentanol, 2-pentanol, 3-pentanol, 1-hexanol, 2-hexanol, 3-hexanol, octanol, 2-ethyl-1-hexanol, nonyl alcohol, lauryl alcohol, cetyl alcohol and stearyl alcohol; alicyclic alcohols containing 3 to 30 carbon atoms such as cyclohexanol; and unsaturated alcohols containing 3 to 30 carbon atoms such as (meth)allyl alcohol, 3-buten-1-ol and 3-methyl-3-buten-1-ol.

Suitable as said esterification products are those (alkoxy)polyethylene glycol (poly)(alkylene glycol containing 2 to 4 carbon atoms) (meth)acrylates which are given below:

Methoxypolyethylene glycol mono(meth)acrylate, methoxy{polyethylene glycol-(poly)propylene glycol} mono(meth)acrylate, methoxy{polyethylene glycol-(poly)butylene glycol} mono(meth)acrylate, methoxy{polyethylene glycol-(poly)propylene glycol-(poly)butylene glycol} mono(meth)acrylate, ethoxypolyethylene glycol mono(meth)acrylate, ethoxy{polyethylene glycol-(poly)propylene glycol} mono(meth)acrylate, ethoxy{polyethylene glycol-(poly)butylene glycol} mono(meth)acrylate, ethoxy{polyethylene glycol-(poly)propylene glycol-(poly)butylene glycol} mono(meth)acrylate, propoxypolyethylene glycol mono(meth)acrylate, propoxy{polyethylene glycol-(poly)propylene glycol} mono(meth)acrylate, propoxy{polyethylene glycol-(poly)butylene glycol} mono(meth)acrylate, propoxy{polyethylene glycol-(poly)propylene glycol-(poly)butylene glycol} mono (meth)acrylate, butoxypolyethylene glycol mono(meth)acrylate, butoxy{polyethylene glycol-(poly)propylene glycol} mono (meth)acrylate, butoxy{polyethylene glycol-(poly)butylene glycol} mono(meth)acrylate, butoxy{polyethylene glycol-(poly)propylene glycol-(poly)butylene glycol} mono(meth) acrylate, pentoxypolyethylene glycol mono(meth)acrylate, pentoxy{polyethylene glycol-(poly)propylene glycol} mono (meth)acrylate, pentoxy{polyethylene glycol-(poly)butylene glycol} mono(meth)acrylate, pentoxy{polyethylene glycol-(poly)propylene glycol-(poly)butylene glycol} mono(meth) acrylate, hexoxypolyethylene glycol mono(meth)acrylate, hexoxy{polyethylene glycol-(poly)propylene glycol} mono (meth)acrylate, hexoxy{polyethylene glycol-(poly)butylene glycol} mono(meth)acrylate, hexoxy{polyethylene glycol-(poly)propylene glycol-(poly)butylene glycol} mono(meth) acrylate, heptoxypolyethylene glycol mono(meth)acrylate, heptoxy{polyethylene glycol-(poly)propylene glycol} mono (meth)acrylate, heptoxy{polyethylene glycol-(poly)butylene glycol} mono(meth)acrylate, heptoxy{polyethylene glycol-(poly)propylene glycol-(poly)butylene glycol} mono(meth) acrylate, octoxypolyethylene glycol mono(meth)acrylate, octoxy{polyethylene glycol-(poly)propylene glycol} mono (meth)acrylate, octoxy{polyethylene glycol-(poly)butylene glycol} mono(meth)acrylate, octoxy{polyethylene glycol-(poly)propylene glycol-(poly)butylene glycol} mono(meth) acrylate, nonanoxypolyethylene glycol mono(meth)acrylate, nonanoxy{polyethylene glycol-(poly)propylene glycol} mono(meth)acrylate, nonanoxy{polyethylene glycol-(poly) butylene glycol} mono(meth)acrylate, nonanoxy{polyethylene glycol-(poly)propylene glycol-(poly)butylene glycol} mono(meth)acrylate, decanoxypolyethylene glycol mono(meth)acrylate, decanoxy{polyethylene glycol-(poly)propylene glycol} mono(meth)acrylate, decanoxy{polyethylene glycol-(poly) butylene glycol} mono(meth)acrylate, decanoxy{polyethylene glycol-(poly)propylene glycol-(poly)butylene glycol} mono(meth)acrylate, undecanoxy- polyethylene glycol mono(meth)acrylate, undecanoxy{polyethylene glycol-(poly)propylene glycol} mono(meth)acrylate, undecanoxy{polyethylene glycol-(poly)butylene glycol} mono(meth)acrylate, undecanoxy{polyethylene glycol-(poly)propylene glycol-(poly)butylene glycol} mono(meth)acrylate, dodecanoxy- polyethylene glycol mono(meth)acrylate, dodecanoxy{polyethylene glycol-(poly)propylene glycol) mono(meth)acrylate, dodecanoxy(polyethylene glycol-(poly)butylene glycol} mono(meth)acrylate, dodecanoxy{polyethylene glycol-(poly)propylene glycol-(poly)butylene glycol} mono(meth)acrylate, tridecanoxypolyethylene glycol mono(meth)acrylate, tridecanoxy{polyethylene glycol-(poly)propylene glycol} mono(meth)acrylate, tridecanoxy{polyethylene glycol-(poly)butylene glycol} mono(meth)acrylate, tridecanoxy{polyethylene glycol-(poly)propylene glycol-(poly)butylene glycol} mono(meth)acrylate, tetradecanoxy- polyethylene glycol mono(meth)acrylate, tetradecanoxy{polyethylene glycol-(poly)propylene glycol} mono(meth)acrylate, tetradecanoxy{polyethylene glycol-(poly)butylene glycol} mono(meth)acrylate, tetradecanoxy{polyethylene glycol-(poly)propylene glycol-(poly)butylene glycol} mono(meth)acrylate, pentadecanoxy- polyethylene glycol mono(meth)acrylate, pentadecanaboxy{polyethylene glycol-(poly)propylene gly-col} mono(meth)acrylate, pentadecanoxy{polyethylene glycol-(poly)butylene glycol} mono(meth)acrylate, pentadecanoxy{polyethylene glycol-(poly)propylene glycol-(poly)butylene glycol} mono(meth)acrylate, hexadecanoxypolyethylene glycol mono(meth)acrylate, hexadecanoxy{polyethylene glycol-(poly)propylene glycol} mono(meth)acrylate, hexadecanoxy{polyethylene glycol-(poly)butylene glycol} mono(meth)acrylate, hexadecanoxy{polyethylene glycol-(poly)propylene glycol-(poly)butylene glycol} mono(meth)acrylate, heptadecanoxy- polyethylene glycol mono(meth)acrylate, heptadecanoxy{polyethylene glycol-(poly)propylene glycol} mono(meth)acrylate, heptadecanoxy{polyethylene glycol-(poly)butylene glycol} mono(meth)acrylate, heptadecanoxy{polyethylene glycol-(poly)propylene glycol-(poly)butylene glycol} mono(meth)acrylate, octadecan- oxypolyethylene glycol mono(meth)acrylate, octadecanoxy{polyethylene glycol-(poly)propylene glycol} mono(meth)acrylate, octadecanoxy{polyethylene glycol-(poly)butylene glycol} mono(meth)acrylate, octadecanoxy{polyethylene glycol-(poly)propylene glycol-(poly)butylene glycol} mono(meth)acrylate, nonadecanoxypolyethylene glycol mono(meth)acrylate, nonadecanoxy{polyethylene glycol-(poly)propylene glycol} mono(meth)acrylate, nonadecanoxy{polyethylene glycol-(poly)butylene glycol} mono(meth)acrylate, nonadecanoxy{polyethylene glycol-(poly)propylene glycol-(poly)butylene glycol} mono(meth)acrylate, cyclopentoxy- polyethylene glycol mono(meth)acrylate, cyclopentoxy{polyethylene glycol-(poly)propylene glycol} mono(meth)acrylate, cyclopentoxy{polyethylene glycol-(poly)butylene glycol} mono(meth)acrylate, cyclopentoxy{polyethylene glycol-(poly)propylene glycol-(poly)butylene glycol} mono(meth)acrylate, cyclohexoxy- polyethylene glycol mono(meth)acrylate, cyclohexoxy{polyethylene glycol-(poly)propylene glycol} mono(meth)acrylate, cyclohexoxy{polyethylene glycol-(poly)butylene glycol} mono(meth)acrylate, cyclohexoxy{polyethylene glycol-(poly)propylene glycol-(poly)butylene glycol} mono(meth)acrylate.

The unsaturated carboxylic acid (salt) monomer of the present invention may be any of those monomers that have a polymerizable unsaturated group and a group capable of forming a carbanion. Suited are, however, an unsaturated monocarboxylic acid monomer, an unsaturated dicarboxylic acid monomer and the like.

The above unsaturated monocarboxylic acid monomer may be any of those monomers that have one unsaturated group and one group capable of forming a carbanion within the molecule. In a preferred embodiment, it is a compound represented by the following formula (2).

$$CH_2 = C - R^8$$
$$\phantom{CH_2 = C -}|$$
$$\phantom{CH_2 = C -}COOM$$

(2)

In the above formula (2), $R^5$ represents a hydrogen atom or a methyl group, and M represents a hydrogen atom, a metal atom, an ammonium group or an organic amine group (an organic ammonium group, namely a protonated organic amine).

Suitable as the metal atom M in the above formula (2) are univalent metal atoms, for example alkali metal atoms such as lithium, sodium and potassium; divalent metal atoms, for example alkaline earth metal atoms such as calcium and magnesium; and trivalent metal atoms such as aluminum and iron. Suitable as the organic amine group are alkanolamine groups such as an ethanolamine group, diethanolamine group and triethanolamine group, and a triethylamine group. Furthermore, it may be an ammonium group. Suitable as such unsaturated monocarboxylic acid monomer are acrylic acid, methacrylic acid, crotonic acid and the like; monovalent metal salts, divalent metal salts, ammonium salts and organic amine salts (organic ammonium salts) thereof, and so forth. Among these, methacrylic acid; monovalent metal salts, divalent metal salts, ammonium salts and organic amine salts thereof and the like are preferably used and suitable as the unsaturated carboxylic acid (salt) monomer from the viewpoint of improved cement dispersing ability.

The above-mentioned unsaturated dicarboxylic acid monomer may be any of those monomers that have one unsaturated group and two groups capable of forming a carbanion within the molecule. Suitable are maleic acid, itaconic acid, citraconic acid, fumaric acid and the like, and monovalent metal salts, divalent metal salts, ammonium salts and organic amine salts thereof, or anhydrides thereof.

In addition to these, also suitable as the above unsaturated dicarboxylic acid monomer are half esters of unsaturated dicarboxylic acid monomers with an alcohol containing 1 to 22 carbon atoms, half amides of unsaturated dicarboxylic acids with an amine containing 1 to 22 carbon atoms, half esters of unsaturated dicarboxylic acid monomers with a glycol containing 2 to 4 carbon atoms, and half amides of maleamic acid with glycols containing 2 to 4 carbon atoms, and so forth.

In the case where the fourth component is contained other than the above-mentioned alkyl (meth)acrylate monomer, polyalkylene glycol unsaturated monomer and unsaturated carboxylic acid (salt) monomer, as the fourth component, an alkyl (meth)acrylate monomer differing from the above-mentioned alkyl (meth)acrylate monomer or a monomer copolymerizable with a monomer other than the above-mentioned three species of monomers may be used. Suitable as such monomer are half esters and diesters derived from unsaturated dicarboxylic acid monomers, such as maleic acid, maleic anhydride, fumaric acid, itaconic acid and citraconic acid, and alcohols containing 23 to 30 carbon atoms; half amides and diamides derived from the above-mentioned unsaturated dicarboxylic acid monomers and amines containing 23 to 30 carbon atoms; half esters and diesters derived from the above-mentioned unsaturated dicarboxylic acid monomers and alkyl(poly)alkylene glycols, which are adducts of 1 to 500 moles of an alkylene oxide(s) containing 2 to 18 carbon atoms with the above-mentioned alcohols or amines; half esters and diesters derived from the above-mentioned unsaturated dicarboxylic acid monomers and glycols containing 5 to 18 carbon atoms or polyalkylene glycols, which are adducts of 2 to 500 moles of an alkylene oxide(s) with such glycols; half amides derived from maleamic acid and glycols containing 5 to 18 carbon atoms or polyalkylene glycols, which are adducts of 2 to 500 moles of an alkylene oxide(s) with such glycols; (poly)alkylene glycol di(meth)acrylates such as triethylene glycol di(meth)acrylate, (poly)ethylene glycol di(meth)acrylate, polypropylene glycol di(meth)acrylate and (poly)ethylene glycol-(poly)propylene glycol di(meth)acrylate; multifunctional (meth)acrylates such as hexanediol di(meth)acrylate, trimethylolpropane tri(meth)acrylate and trimethylolpropane di(meth)acrylate; (poly)alkylene glycol dimaleates such as triethylene glycol dimaleate and polyethylene glycol dimaleate; unsaturated sulfonic acids and monovalent metal salts, divalent metal salts, ammonium salts and organic amine salts thereof, for example vinylsulfonates, (meth)allylsulfonates, 2-(meth)acryloxyethylsulfonates, 3-(meth)acryloxypropylsulfonates, 3-(meth)acryloxy-2-hydroxypropylsulfonates, 3-(meth)acryloxy-2-hydroxypropyl sulfophenyl ether, 3-(meth)acryloxy-2-hydroxypropyloxysulfobenzoates, 4-(meth)acryloxybutylsufonates, (meth)acrylamidomethylsulfonates, (meth)acrylamidoethylsulfonates, 2-methylpropanesulfonic acid (meth)acrylamide, and styrenesulfonic acid; amides derived from unsaturated monocarboxylic acids and amines containing 1 to 30 carbon atoms, for example methyl(meth)acrylamide; vinyl aromatics such as styrene, α-methylstyrene, vinyltoluene and p-methylstyrene; alkanediol mono(meth)acrylates such as 1,4-butanediolmono (meth)acrylate, 1,5-pentanediol mono(meth)acrylate and 1,6-hexanediol mono(meth)acrylate; dienes such as butadiene, isoprene, 2-methyl-1,3-butadiene and 2-chloro-1,3-butadiene; unsaturated amides such as (meth)acrylamide, (meth)acrylalkylamides, N-methylol(meth)acrylamide and N,N-dimethyl(meth)acrylamide; unsaturated cyano compounds such as (meth)acrylonitrile and α-chloroacrylonitrile; unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate and vinylpyridine; divinyl aromatics such as divinylbenzene; cyanurates such as triallyl cyanurate; and siloxane derivatives such as polydimethylsiloxanepropylaminomaleamidic acid, polydimethylsiloxaneaminopropyleneaminomaleamidic acid, polydimethylsiloxane-bis(propylaminomaleamidic acid), polydimethylsiloxane-bis(dipropyleneaminomaleamidic acid), polydimethylsiloxane-(1-propyl-3-acrylate), polydimethylsiloxane-(1-propyl-3-methacrylate), polydimethylsiloxane-bis(1-propyl-3-acrylate) and polydimethylsiloxane-bis(1-propyl-3-methacrylate). These may be used singly or two or more of them may be used combinedly.

In the following, the production method of the polycarboxylic acid polymer of the present invention is described.

As the above-mentioned production method, there may be mentioned, for example, polymerization methods such as solution polymerization and bulk polymerization using the monomer components and a polymerization initiator. Preferred as the polymerization initiator, for example, persulfate salts such as ammonium persulfate, sodium persulfate and potassium persulfate; hydrogen peroxide; azo compounds such as azobis-2-methylpropionamidine hydrochloride and azoisobutyronitrile; peroxides such as benzoyl peroxide, lauroyl peroxide and cumene hydroperoxide; and so forth. Furthermore, as the promoter, reducing agents such as sodium hydrogensulfite, sodium sulfite, Mohr's salt, sodium pyrobisulfite, formaldehyde sodium sulfoxylate and ascorbic acid; and amine compounds such as ethylenediamine, sodium ethylenediaminetetraacetate and glycine can be used in combination. These polymerization initiators and promoters may be used singly or two or more of them may be used in combination.

In the above polymerization method, a chain transfer agent may be used according to need. One or two or more species of such chain transfer agents may be used, and it is also possible to use a hydrophobic chain transfer agent.

Suitable as the above hydrophobic chain transfer agent are thiol compounds containing a hydrocarbon group with not less than 3 carbon atoms, or compounds having the solubility in water at 25° C. of not more than 10%. For example, preferred are the chain transfer agent mentioned above, thiol chain transfer agents such as butanethiol, octanethiol, decanethiol, dodecanethiol, hexadecanethiol, octadecanethiol, cyclohexyl mercaptan, thiophenol, octyl thioglycolate, octyl 2-mercaptopropionate, octyl 3-mercaptopropionate, 2-ethylhexyl mercaptopropionate, 2-mercaptoethyl octanoate, 1,8-dimercapto-3,6-dioxaoctane, decanetrithiol and dodecyl mercaptan; halides such as carbon tetrachloride, carbon tetrabromide, methylene chloride, bromoform and bromotrichloroethane; and unsaturated hydrocarbon compounds such as α-methylstyrene dimer, α-terpinene, γ-terpinene, dipentene and terpinolene. These may be used singly or two or more of them may be used in combination. Among these, the thiol chain transfer agent containing a hydrocarbon group with not less than 3 carbon atoms is preferably contained.

The above hydrophobic chain transfer agent may be used in combination with one or two or more species of hydrophilic chain transfer agents according to need. As such hydrophilic chain transfer agent, for example, preferred are thiol chain transfer agents such as mercaptoethanol, thioglycerol, thioglycolic acid, mercaptopropionic acid, 2-mercaptopropionic acid, 3-mercaptopropionic acid, thiomalic acid, and 2-mercaptoethanesulfonic acid; primary alcohols such as 2-aminopropane-1-ol; secondary alcohols such as isopropanol; phosphorous acid, hypophosphorous acid and salts thereof (e.g. sodium hypophosphite, potassium hypophosphite), sulfurous acid, hydrosulfurous acid, dithionous acid, metabisulfurous acid, and salts thereof (e.g. sodium sulfite, sodium hydrogen sulfite, sodium dithionite, sodium metabisulfite, potassium sulfite, potassium hydrogen sulfite, potassium dithionite, potassium metabisulfite), and like lower oxides and salts thereof.

As for the method of adding the above chain transfer agent to the reaction vessel, such a continuous charging method as dripping and divided charging can be applied. The chain transfer agent may be introduced singly into the reaction vessel, or it may be admixed in advance with the monomer containing the oxyalkylene group constituting the monomer components, a solvent or the like.

The above polymerization may be carried out either batchwise or continuously. As a preferred solvent which is used where necessary in the step of polymerization, there may be mentioned water; alcohols such as methyl alcohol, ethyl alcohol and isopropyl alcohol; aromatic or aliphatic hydrocarbons such as benzene, toluene, xylene, cyclohexane and n-heptane; esters such as ethyl acetate; and ketones such as acetone and methyl ethyl ketone. These may be used singly or two or more of them may be used in combination. Among them, one or two or more solvents selected from the group consisting of water and lower alcohols containing 1 to 4 carbon atoms are preferably used from the viewpoint of solubility of the monomer components and the product polymer.

As for the method of adding the monomer components, polymerization initiator, etc. to the reaction vessel in the above-mentioned polymerization method, the method comprising charging the reaction vessel with all monomer components and then adding the polymerization initiator thereto to conduct polymerization; the method comprising charging the reaction vessel with some of monomer components and then adding the polymerization initiator and residual monomer components thereto to conduct polymerization; and the method comprising charging the reaction vessel with the polymerization solvent and then adding the whole amount of the monomer components and polymerization initiator thereto are suitable. Among such methods, the method comprising carrying out the polymerization by adding the polymerization initiator and monomer components dropwise successively to the reaction vessel is preferred since the molecular weight distribution of the product polymer can be made narrow (sharp) and the cement dispersing ability for increasing the fluidity of cement compositions and the like can be improved thereby. Furthermore, the polymerization reaction is preferably carried out with maintaining the concentration of water in the reaction vessel during the polymerization to not more than 50% since the preservation stability of the obtained polymer is more improved by the improvement of the polymerizability of the monomer components. More preferably, it is not more than 40%, and still more preferably not more than 30%.

In the above method of polymerization, the polymerization temperature and other polymerization conditions are appropriately selected according to the polymerization method, solvent, polymerization initiator, and chain transfer agent employed. Generally, the polymerization temperature is preferably not lower than 0° C. and not higher than 150° C. More preferably, it is not lower than 40° C., still more preferably not lower than 50° C., and especially preferably not lower than 60° C. Furthermore, it is more preferably not higher than 120° C., still more preferably not higher than 100° C., and especially preferably not higher than 85° C.

The polycarboxylic acid polymer obtained by the above method of polymerization as such can be used as the main component of cement additives. Where necessary, it may be used after further neutralization with an alkaline substance. Preferably used as the alkaline substance are inorganic salts such as monovalent and divalent metal hydroxides, chlorides and carbonates; ammonia; and organic amines.

The polycarboxylic acid concrete admixture of the present invention can be produced by polymerizing the above-mentioned monomer components. As the polymerization method, the above-mentioned methods are preferred, and the species and amounts of the monomers in the monomer components and the polymerization conditions are appropriately set.

In the above-mentioned polymerization method, it is preferable to change the mole ratio of the monomer components in a reaction vessel at least once during the reaction. In this case, it is preferable to change the mole ratio between the polyalkylene glycol unsaturated monomer and the unsaturated carboxylic acid (salt) monomer and/or the alkyl (meth) acrylate monomer at least once during the reaction. That is, during the reaction, it is preferable to change the mole ratio between the polyalkylene glycol unsaturated monomer and unsaturated carboxylic acid (salt) monomer and the mole ratio between the polyalkylene glycol unsaturated monomer and the alkyl (meth)acrylate monomer. When a mixture of two or more species of copolymers is produced by changing the mole ratio of the monomer components during the polymerization in such a manner, the concrete admixture using the mixture formed with said copolymer is provided with a variety of properties of the respective copolymers; accordingly, a concrete admixture capable of improving the working efficiency can be produced.

Changing of the mole ratio mentioned above may be carried out by increasing the mole ratio, decreasing the mole ratio, or combining increase and decrease of the ratios and changing the alteration extents. The mole ratio may be changed stepwise or continuously. As a method for changing the mole ratio during the polymerization in such a manner, there may be mentioned, for example, a method of adding dropwisely one or all of the polyalkylene glycol unsaturated monomer (hereinafter, referred to also as the monomer (A)), the unsaturated carboxylic acid (salt) monomer (hereinafter, referred to also as the monomer (B)), and the alkyl (meth) acrylate monomer (hereinafter, referred to also as the monomer (C)) to a polymerization vessel and changing the dropping rate of the monomer to be added stepwise or continuously.

Changing of the mole ratio mentioned above involves a step of changing at least one of the mole ratios of A/B and A/C at least once during polymerization of the monomer (A), the monomer (B), and the monomer (C) in a polymerization vessel, wherein the molar numbers of the respective monomers (A), (B) and (C) charged from the initial stage to that point, in which the above-mentioned monomer composition are used, are represented as A, B and C, respectively. Furthermore, the mole ratio B/C may be changed or may not be changed during the polymerization.

In the production method of the present invention, polymerization is carried out by adding the monomer (C) dropwise, and it is preferable to change the dropping rate of the monomer (C). Thereby, the mole ratio A/C can be changed at least once during the polymerization.

Incidentally, in the embodiment comprising changing the mole ratio A/C at least once during the polymerization, for example, the mole ratio may be changed during the polymerization by carrying out polymerization of the monomer (A) and the monomer (B), and the monomer (A), the monomer (B) and the monomer (C). In this case, there exist the polymerization period for producing a copolymer of the monomer (A) and the monomer (B) and the polymerization period for producing a copolymer of the monomer (A), the monomer (B), and the monomer (C). In the case where the monomer (C) is added dropwise, after the polymerization of the monomer (A) and the monomer (B) is carried out, the polymerization of the monomer (A), the monomer (B) and the monomer (C) is carried out by adding the monomer (C) dropwise to change the mole ratio A/C at least once during the polymerization.

The mole ratio A/B, which represents the mole ratio of the monomer (A)/the monomer (B), is preferably not less than 0.1 and not more than 2. More preferably, it is not less than 0.3 and not more than 1.2.

In the above-mentioned methods for changing the mole ratio, at least two different copolymers with different mole ratio A/B/C of the respective monomer units are contained. From the viewpoint that the concrete admixture using the copolymers has various characteristics of the respective copolymers, and the sufficient effects of the present invention are exhibited, it is preferable that a copolymer mixture containing three or more different species of copolymers with different mole ratio A/B/C is essentially comprised. That is, it is preferable that a mixture comprising not less than three species of copolymers is formed by changing the mole ratio of the monomer components during the polymerization.

Furthermore, it is preferable that a copolymer mixture comprising not less than three species of copolymers is essentially comprised among copolymers obtained by polymerizing monomer components containing three or more species of monomers, the monomer (A), the monomer (B) and the monomer (C), and copolymers obtained by polymerizing monomer components containing two species of monomers, the monomer (A) and the monomer (B). That is, it is preferable that a copolymer mixture containing three or more species of copolymers with different mole ratio of A/B/C, or a copolymer mixture containing two or more species of copolymers with different mole ratio of A/B/C and one or more species of copolymers obtained by using two species of monomers, the monomer (A) and the monomer (B) is essentially comprised.

The polycarboxylic acid concrete admixture of the present invention comprises the above-mentioned polycarboxylic acid polymer as an essential component. Such polycarboxylic acid concrete admixture indicates an agent capable of being incorporated in cement compositions and the like, namely an agent comprising a cement additive and the like. The polycarboxylic acid concrete admixture comprising the above-mentioned constituents as main components is one of the preferred embodiments of the present invention. The constituents according to the present invention are suited for use as the main components of cement additives and they can constitute the polycarboxylic acid concrete admixture of the present invention. Such a cement additive is described below.

The above cement additives can be added to cement compositions such as cement paste, mortar, concrete or the like and used. And, they can suitably be used also in ultrahigh strength concrete.

Suitable as the above cement composition are ones in general use which contain cement, water, fine aggregate, coarse aggregate and the like. These may be added with fine powders, such as fly ash, blast-furnace slag, silica fume and limestone.

The term "ultrahigh strength concrete" means the one generally so called in the field of cement compositions, namely that kind of concrete which, in strength of the cured products thereof, is comparable to or higher than that of conventional concrete species even when the water/cement ratio is reduced as compared with conventional levels. For example, even when the water/cement ratio is not higher than 25% by mass, further not higher than 20% by mass, in particular not higher than 18% by mass, particularly not higher than 14% by mass, especially about 12% by mass, that kind of concrete shows that level of workability at which any trouble will not arise in ordinary use, and the cured product shows a compressive strength of not lower than 60 $N/mm^2$, further not lower than 80 $N/mm^2$, further more not lower than 100 $N/mm^2$, in particular not lower than 120 $N/mm^2$, particularly not lower than 160 $N/mm^2$, especially not lower than 200 $N/mm^2$.

Suitable as the above cement are ordinary, high early strength, ultra high early strength, moderate heat, white or like portland cement; and blended portland cement species such as high alumina cement, calucium-alumina cement, portland fly-ash cement, portland blast-furnace slag cement, silica cement and the like. As the mixing amount and the unit water content of said cement per 1 $m^3$ of concrete is, for example, for producing high durability and high strength concrete, the unit water content is preferably 100 to 185 $kg/m^3$ and the water/cement ratio is preferably 10 to 70%. More preferably, the unit water content is 120 to 175 $kg/m^3$, and water/cement ratio is 20 to 65%.

As regards the addition amount of the above-mentioned cement additive to the cement composition, it is preferred that the polycarboxylic acid polymer comprised in the present invention amount to not less than 0.01% by mass and not more than 10% by mass relative to the whole cement mass being taken as 100% by mass. If it is less than 0.01% by mass, insufficient performance characteristics may result. If it exceeds 10% by mass, the economy will be poor. More preferably, it is not less than 0.05% by mass and not more than 8% by mass, still more preferably not less than 0.1% by mass and not more than 5% by mass.

Said mass percentage values are reduced values of the solid matter.

The cement additive can be used in combination with any of those cement dispersants that are in general use. As the above cement dispersants, the following are suitable.

Ligninsulfonates; polyol derivatives; naphthalenesulfonic acid-formaline condensates; melaminesulfonic acid-formaline condensates; polystyrenesulfonic acid salts; aminosulfonic acid compounds such as aminoarylsulfonic acid-phenol-formaldehyde condensates as described in Japanese Kokai Publication Hei-01-113419; cement dispersants comprising, as component (a), a copolymer of a polyalkylene glycol mono(meth)acrylate compound and a (meth)acrylic acid compound and/or a salt of said copolymer, as component (b), a copolymer of a polyalkylene glycol mono(meth)allyl ether compound and maleic anhydride and/or a hydrolyzate of said copolymer and/or a salt thereof and, as component (c), a copolymer of a polyalkylene glycol mono(meth)allyl ether compound and a maleic acid ester of a polyalkylene glycol compound, and/or a salt thereof, as described in Japanese Kokai Publication Hei-07-267705; concrete admixtures comprising, as component A, a copolymer of a polyalkylene glycol (meth)acrylate and (meth)acrylic acid (or a salt thereof), as component B, a specific polyethylene glycol-polypropylene glycol compound and, as component C, a specific surfactant, as described in Japanese Patent No. 2508113; copolymers of polyethylene(propylene) glycol (meth)acrylate or polyethylene(propylene) glycol mono(meth)allyl ether, (meth)allylsulfonic acid (or a salt thereof) and (meth)acrylic acid (or a salt thereof), as described in Japanese Kokai Publication Sho-62-216950;

copolymers of polyethylene(propylene) glycol (meth)acrylate, (meth)allylsulfonic acid (or a salt thereof) and (meth)acrylic acid (or a salt thereof), as described in Japanese Kokai Publication Hei-01-226757; copolymers of polyethylene(propylene) glycol (meth)acrylate, (meth)allylsulfonic acid (or a salt thereof) or p-(meth)allyloxybenzenesulfonic acid (or a salt thereof) and (meth)acrylic acid (or a salt thereof), as described in Japanese Kokoku Publication Hei-05-36377; copolymers of polyethylene glycol mono(meth)allyl ether and maleic acid (or a salt thereof), as described in Japanese Kokai Publication Hei-04-149056; copolymers of polyethylene glycol (meth)acrylate, (meth)allylsulfonic acid (or a salt thereof), (meth)acrylic acid (or a salt thereof), an alkanediol mono(meth)acrylate, a polyalkylene glycol mono (meth)acrylate and an α,β-unsaturated monomer containing an amide group within the molecule, as described in Japanese Kokai Publication Hei-05-170501; copolymers of polyethylene glycol mono(meth)allyl ether, polyethylene glycol mono (meth)acrylate, an alkyl (meth)acrylate, (meth)acrylic acid (or a salt thereof) and (meth)allylsulfonic acid (or a salt thereof) or p-(meth)allyloxybenzenesulfonic acid (or a salt thereof), as described in Japanese Kokai Publication H06-191918; copolymers of an alkoxypolyalkylene glycol monoallyl ether and maleic anhydride, or hydrolyzates thereof, or salts thereof, as described in Japanese Kokai Publication Hei-05-43288; copolymers of polyethylene glycol monoallyl ether, maleic acid and a monomer copolymerizable with these monomers, or salts thereof, or esters thereof, as described in Japanese Kokoku Publication Sho-58-38380;

copolymers of a polyalkylene glycol mono(meth)acrylate monomer, a (meth)acrylic acid monomer and a monomer copolymerizable with these monomers, as described in Japanese Kokoku Publication Sho-59-18338; copolymers of a (meth)acrylic acid ester containing a sulfonic acid group and a monomer coplymerizable with these as necessary, or salts thereof, as described in Japanese Kokai Publication Sho-62-119147; esterification reaction products from a copolymer of an alkoxypolyalkylene glycol monoallyl ether and maleic anhydride and an alkenyl-terminated polyoxyalkylene derivative, as described in Japanese Kokai Publication Hei-06-271347; esterification reaction products from a copolymer of an alkoxypolyalkylene glycol monoallyl ether and maleic anhydride and a hydroxy-terminated polyoxyalkylene derivative, as described in Japanese Kokai Publication Hei-06-298555; copolymers of alkenyl ether monomer obtained by addition of an ethylene oxide to a specific unsaturated alcohol, such as 3-methyl-3-buten-1-ol, an unsaturated carboxylic acid monomer and a monomer copolymerizable with these, or salts thereof as described in Japanese Kokai Publication Sho-62-68806 or like polycarboxylic acids (or salts thereof). These cement dispersants may be used singly or two or more of them may be used in combination.

In cases when said cement dispersant is used in combination, the mixing mass ratio between the above cement additive and the above cement dispersant is preferably within the range of 5 to 95:95 to 5, more preferably 10 to 90:90 to 10, although it cannot be definitely determined according to the cement dispersant species and mix formulation employed, the test conditions and other factors.

Furthermore, the polycarboxylic acid concrete admixture of the present invention is preferably in the embodiment that the polycarboxylic acid concrete admixture comprises the above-mentioned polycarboxylic acid polymer and another polycarboxylic acid polymer differing from said polymer. The polycarboxylic acid polymer differing from the above-mentioned polycarboxylic acid polymer may be any polycarboxylic acid polymers having a different acid value, molecular weight, structure of a constituent unit, composition of a constituent unit and the like from the above-mentioned polycarboxylic acid polymer. For example, preferred are a copolymer (D) containing a constituent unit derived from a (poly) alkylene glycol mono(meth)acrylic acid ester monomer and a constituent unit derived from an unsaturated monocarboxylic acid monomer; a copolymer (E) containing a constituent unit derived from an unsaturated (poly)alkylene glycol ether monomer and a constituent unit derived from a maleic acid monomer; a copolymer (F) containing a constituent unit derived from an unsaturated (poly)alkylene glycol ether monomer and a constituent unit derived from an unsaturated monocarboxylic acid monomer; a hydrophilic graft polymer obtained by graft polymerization of an unsaturated carboxylic acid monomer to a polyether compound, as described in Japanese Kokai Publication Hei-07-53645, Hei-08-208769 and Hei-08-208770. Among them, the use of at least one copolymer selected from the group consisting of the above-mentioned copolymer (D), copolymer (E) and copolymer (F) is preferable. These polymers may be used singly or two or more of these may be used in combination.

By comprising two or more species of polycarboxylic acid polymers in such a manner, the above-mentioned polycarboxylic acid concrete admixture is provided with a variety of properties of the blended polycarboxylic acid polymers. Therefore, when such admixture is added to a cement composition and the like, properties such as decreasing the concrete viscosity, improving the slump-retaining ability, and suppressing bleeding water can be more sufficiently exhibited. As such polycarboxylic acid concrete admixture, these polycarboxylic acid polymers may be blended to be a mixture prior to addition to a cement composition and the like, or the polymers may be separately added to a cement composition and the like to be a mixture in the cement composition and the like.

In the above-mentioned polycarboxylic acid concrete admixture, the mixing mass ratio between the above-mentioned polycarboxylic acid polymer and another polycarboxylic acid polymer differing from said polymer is preferably 5 to 95:95 to 5. More preferably, it is 10 to 90:90 to 10. In an especially preferred embodiment, the ratio of the above-mentioned polycarboxylic acid polymer (the polycarboxylic acid polymer comprised as an essential component in the polycarboxylic acid concrete admixture of the present invention) is not less than 50% by mass relative to 100% by mass, the total amount, of the polycarboxylic acid concrete admixture. Thereby, the effects of the present invention can be sufficiently exhibited. More preferably, it is not less than 60% by mass. The preferred range is 50 to 95% by mass.

In the following, the copolymer (D), copolymer (E), and copolymer (F) are described. The methods for producing these copolymers are not particularly restricted, and general polymerization method can be used.

The copolymer (D) is a copolymer comprising a constituent unit represented by the following formula (3);

(wherein $R^6$, $R^7$ and $R^8$ may be the same or different and each represents a hydrogen atom or a methyl group; and $M^1$ represents a hydrogen atom, a monovalent metal, a divalent metal, an ammonium group or an organic ammonium group), and a constituent unit represented by the following formula (4);

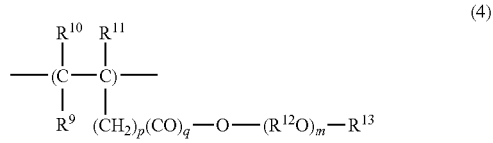

(wherein $R^9$, $R^{10}$ and $R^{11}$ may be the same or different and each represents a hydrogen atom or a methyl group; p represents a number of 0; q represents a number of 1; $R^{12}$ may be the same or different and represents an alkylene group containing 2 to 18 carbon atoms; m represents an average molar number of addition of the oxyalkylene group represented by $R^{12}O$ and is a number of 1 to 300; $R^{13}$ represents a hydrogen atom or a hydrocarbon group containing 1 to 20 carbon atoms).

The above-mentioned copolymer (D) comprises the above two species of constituent units, but may further comprise a constituent unit derived from other copolymerizable monomer (for example, the monomer described as the fourth component in the above-mentioned polycarboxylic acid polymer). These constituent units in the copolymer (D) may respectively be one species or two or more species.

In the above-mentioned copolymer (D), it is preferable that the constituent unit represented by the above formula (3) and the constituent unit represented by the above formula (4) each accounts for not less than 1% by mass relative to the whole constituent units. These ratios are preferably: the constituent unit represented by the above formula (3)/the constituent unit represented by the above formula (4) (% by mass)=1 to 99/99 to 1. More preferably, it is 2 to 90/98 to 10, and still more preferably 3 to 70/97 to 30, and especially preferably 4 to 50/96 to 50. In the copolymer (D), the total content (% by mass) of the constituent unit represented by the above formula (3) and the constituent unit represented by the above formula (4) is preferably 50 to 100% by mass, relative to the whole colymer (D). More preferably, it is 70 to 100% by mass.

The copolymer (E) is a copolymer comprising a constituent unit represented by the above formula (3) (in the formula, $R^7$ and $R^8$ may be the same or different and each represents a hydrogen atom or a methyl group; $R^6$ represents $COOM^2$; and $M^1$ and $M^2$ may be the same or different and each represents a hydrogen atom, a monovalent metal, a divalent metal, an ammonium group or an organic ammonium group), and a constituent unit represented by the above formula (4) (in the formula, $R^9$, $R^{10}$ and $R^{11}$ may be the same or different and each represents a hydrogen atom or a methyl group; p represents a number of 0 to 2; q represents a number of 0; $R^{12}$ may be the same or different and represents an alkylene group containing 2 to 18 carbon atoms; m represents an average molar number of addition of the oxyalkylene group represented by $R^{12}O$ and is a number of 1 to 300; $R^{13}$ represents a hydrogen atom or a hydrocarbon group containing 1 to 20 carbon atoms).

The above-mentioned copolymer (E) comprises the above two species of constituent units, but may further comprise a constituent unit derived from other copolymerizable monomer (for example, the monomer described as the fourth component in the above-mentioned polycarboxylic acid polymer). These constituent units in the copolymer (E) may respectively be one species or two or more species.

In the above-mentioned copolymer (E), it is preferable that the constituent unit represented by the above formula (3) and the constituent unit represented by the above formula (4) each accounts for not less than 1% by mass relative to the whole constituent units. These ratios are preferably: the constituent unit represented by the above formula (3)/the constituent unit represented by the above formula (4) (% by mass)=1 to 99/99 to 1. More preferably, it is 2 to 90/98 to 10, and still more preferably 3 to 70/97 to 30. In the copolymer (E), the total content (% by mass) of the constituent unit represented by the above formula (3) and the constituent unit represented by the above formula (4) is preferably 50 to 100% by mass, relative to the whole colymer (E). More preferably, it is 70 to 100% by mass.

The copolymer (F) is a copolymer comprising a constituent unit represented by the above formula (3) (in the formula, $R^6$, $R^7$ and $R^8$ may be the same or different and each represents a hydrogen atom or a methyl group; and $M^1$ represents a hydrogen atom, a monovalent metal, a divalent metal, an ammonium group or an organic ammonium group), and a constituent unit represented by the above formula (4) (in the formula, $R^9$, $R^{10}$ and $R^{11}$ may be the same or different and each represents a hydrogen atom or a methyl group; p represents a number of 0 to 2; q represents a number of 0; $R^{12}$ may be the same or different and represents an alkylene group containing 2 to 18 carbon atoms; m represents an average molar number of addition of the oxyalkylene group represented by $R^{12}O$ and is a number of 1 to 300; $R^{13}$ represents a hydrogen atom or a hydrocarbon group containing 1 to 20 carbon atoms).

The above-mentioned copolymer (F) comprises the above two species of constituent units, but may further comprise a constituent unit derived from other copolymerizable monomer (for example, the monomer described as the fourth component in the above-mentioned polycarboxylic acid polymer). These constituent units in the copolymer (F) may respectively be one species or two or more species.

In the above-mentioned copolymer (F), it is preferable that the constituent unit represented by the above formula (3) and the constituent unit represented by the above formula (4) each accounts for not less than 1% by mass relative to the whole constituent units. These ratios are preferably: the constituent unit represented by the above formula (3)/the constituent unit represented by the above formula (4) (% by mass)=1 to 99/99 to 1. More preferably, it is 2 to 90/98 to 10, and still more preferably 3 to 70/97 to 30. In the copolymer (F), the total content (% by mass) of the constituent unit represented by the above formula (3) and the constituent unit represented by the above formula (4) is preferably 50 to 100% by mass, relative to the whole colymer (F). More preferably, it is 70 to 100% by mass.

In addition, as the method for separating polycarboxylic acid polymer, cloud point-separation, gel permeation chromatography (GPC)-preparation, liquid chromatography (LC)-preparation, capillary electrophoresis, and dialysis process and the like are exemplified, and polycarboxylic acid polymer can be separated by combining these methods suitably.

The polycarboxylic acid concrete admixture of the present invention can also be used in combination with other cement additives. As the other cement additives, for example, there may be mentioned the following cement additives (ingredients).

(1) Water-soluble macromolecular substances; unsaturated carboxylic acid polymers such as polyacrylic acid (sodium salt), polymethacrylic acid (sodium salt), polymaleic acid (sodium salt) and acrylic acid-maleic acid copolymer sodium salt; polyoxyethylene or polyoxypropylene polymers or copolymers thereof, such as polyethylene glycol and polypropylene glycol; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharides produced by microbial fermentation, such as yeast glucans, xanthan gum, β-1,3-glucans (which may be straight chained or branched; e.g. curdlan, paramylum, pachyman, scleroglucan, laminaran); polyacrylamide; polyvinyl alcohol; starch; starch phosphate; sodium alginate; gelatin; amino-containing acrylic acid copolymers and quaternization products derived therefrom; and the like;

(2) Polymer emulsions; copolymers of various vinyl monomers such as alkyl (meth)acrylates;

(3) Retarders; oxycarboxylic acids (or salts thereof) and inorganic or organic salts, such as gluconic acid, glucoheptonic acid, arabonic acid, malic acid and citric acid, and sodium, potassium, calcium, magnesium, ammonium and triethanolamine salts thereof; saccharides, for example monosaccharides, disaccharides, trisaccharides and like oligosaccharides, such as glucose, fructose, galactose, saccharose, xylose, apiose, ribose and isomerized saccharide, oligosaccharides such as dextrin, polysaccharides such as dextran, molasses and like mixtures containing these; sugar alcohols such as sorbitol; magnesium fluorosilicate; phosphoric acid and salts thereof or borate esters; aminocarboxylic acids and salts thereof; alkali-soluble proteins; humic acid; tannic acid; phenols; polyhydric alcohols such as glycerol; phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta(methylenephosphonic acid) and alkali metal salts and alkaline earth metal salts of these; and the like;

(4) High-early-strength agents or accelerators; soluble calcium salts such as calcium chloride, calcium nitrite, calcium nitrate, calcium bromide and calcium iodide; chlorides such as iron chloride and magnesium chloride; sulfate salts; potassium hydroxide; sodium hydroxide; carbonate salts; thiosulfate salts; formic acid and formate salts such as calcium formate; alkanolamines; alumina cement; calcium aluminosilicate; and the like;

(5) Mineral oil antifoaming agents, kerosene, liquid paraffin, etc.;

(6) Fat or oil antifoaming agents; animal/vegetable oils, sesame oil, castor oil, alkylene oxide adducts derived from these, and the like;

(7) Fatty acid antifoaming agents; oleic acid, stearic acid, alkylene oxide adducts derived from these, and the like;

(8) Fatty acid ester antifoaming agents; glycerin monoricinolate, alkenylsuccinic acid derivatives, sorbitol monolaurate, sorbitol trioleate, natural waxes, etc.;

(9) Oxyalkylene antifoaming agents; polyoxyalkylenes such as (poly)oxyethylene-(poly)oxypropylene adducts; (poly)oxyalkyl ethers such as diethylene glycol heptyl ether, polyoxyethylene oleyl ether, polyoxypropylene butyl ether, polyoxyethylene-polyoxypropylene 2-ethylhexyl ether and oxyethylene-oxypropylene adducts of higher alcohols containing 12 to 14 carbon atoms; (poly)oxyalkylene (alkyl)aryl ethers such as polyoxypropylene phenyl ether and polyoxyethylene nonylphenyl ether; acetylene ethers derived from acetylene alcohol by addition polymerization of an alkylene oxide, such as 2,4,7,9-tetramethyl-5-decyne-4,7-diol, 2,5-dimethyl-3-hexyne-2,5-diol and 3-methyl-1-butyn-3-ol; (poly)oxyalkylene fatty acid esters such as diethylene glycol oleate, diethylene glycol laurate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl) ether sulfate ester salts such as sodium polyoxypropylenemethyl ether sulfate and sodium polyoxyethylene dodecylphenol ether sulfate; (poly)oxyalkylenealkyl phosphate esters such as (poly)oxyethylenestearyl phosphate; (poly)oxyalkylenealkylamines such as polyoxyethylenelaurylamine; polyoxyalkyleneamides; etc.;

(10) Alcohol antifoaming agents; octyl alcohol, hexadecyl alcohol, acetylene alcohol, glycols, etc.;

(11) Amide antifoaming agents; acrylate polyamines etc.;

(12) Phosphate ester antifoaming agents; tributyl phosphate, sodium octyl phosphate, etc.;

(13) Metal soap antifoaming agents; aluminum stearate, calcium oleate, etc.;

(14) Silicone antifoaming agents; dimethylsilicone oils, silicone pastes, silicone emulsions, organic modified polysiloxanes (polyorganosiloxanes such as dimethylpolysiloxane), fluorosilicone oils, etc.;

(15) AE (air-entraining) agents; resin soaps, saturated or unsaturated fatty acids, sodium hydroxystearate, lauryl sulfate, ABS (alkylbenzenesulfonates), LAS (linear alkylbenzenesulfonates), alkanesulfonates, polyoxyethylene alkyl(phenyl) ethers, polyoxyethylene alkyl(phenyl) ether sulfates and salts thereof, polyoxyethylene alkyl(phenyl) ether phosphates and salts thereof, proteinous materials, alkenylsulfosuccinic acids, α-olefinsulfonates, etc.;

(16) Other surfactants; polyalkylene oxide derivatives produced by addition of not less than 10 moles of an alkylene oxide, such as ethylene oxide and/or propylene oxide to monohydric aliphatic alcohol containing 6 to 30 carbon atoms, such as octadecyl alcohol or stearyl alcohol, a monohydric alicyclic alcohol containing 6 to 30 carbon atoms, such as abietyl alcohol, a monomercaptan containing 6 to 30 carbon atoms, such as dodecyl mercaptan, an alkylphenol containing 6 to 30 carbon atoms, such as nonylphenol, an amine containing 6 to 30 carbon atoms, such as dodecylamine, or a carboxylic acid containing 6 to 30 carbon atoms, such as lauric acid or stearic acid; alkyl diphenyl ether sulfonate salts containing two sulfo-containing phenyl groups, which may have an alkyl or alkoxy group as a substituent, bound together by ether bonding; various anionic surfactants, various cationic surfactants such as alkylamine acetates and alkyltrimethylammonium chlorides; various nonionic surfactants; various amphoteric surfactants; and the like;

(17) Water-proof agents; fatty acids (salts), fatty acid esters, fats and oils, silicones, paraffins, asphalts, waxes, etc.;

(18) Corrosion inhibitors; nitrite salts, phosphate salts, zinc oxide, etc.;

(19) Crack inhibitors; polyoxyalkyl ethers; alkanediols such as 2-methyl-2,4-pentanediol; etc.;

(20) Expansive additives; ettringite materials, coals, etc.

As other cement additives (ingredients), there may be mentioned cement wetting agents, thickening agents, segregation reducing agents, flocculants, agents to reduce drying shrinkage, agents to increase strength, self-leveling agents, corrosion inhibitors, color difference agents, antifungal agents, blast-furnace slag, fly ash, cinder ash, clinker ash, husk ash, silica fume, silica powder, gypsum and so forth. These cement additives (ingredients) may be used singly or two or more of them may be used in combination.

The above cement additives may be used in combination not only with the above-mentioned cement dispersants and/or cement additives (ingredients) but also with additives for improving the dispersing ability and/or foaming suppressing ability of a cement composition. As for the method of adding these cement additives and cement dispersants to a cement composition, it is preferable to mix such cement additive and cement dispersant together to give a cement admixture to thereby facilitate the incorporation thereof into the cement composition.

The following combinations (1) to (6) of constituents other than cement and water in the above-mentioned cement composition may be mentioned as particularly preferred embodiments:

(1) Combination of <1> the polycarboxylic acid concrete admixture of the present invention and <2> an oxyalkylene antifoaming agent as two essential constituents. The mixing mass ratio of the oxyalkylene antifoaming agent <2> is preferably 0.01 to 20% by mass relative to the polycarboxylic acid concrete admixture <1>.

(2) Combination of <1> the polycarboxylic acid concrete admixture of the present invention, <2> the oxyalkylene antifoaming agent, and <3> an AE (air-entraining) agent as three essential constituents. Usable as the oxyalkylene antifoaming agents are polyoxyalkylenes, polyoxyalkylene alkyl ethers, polyoxyalkylene acetylene ethers, polyoxyalkylene alkyl amines. Among them, polyoxyalkylene alkyl amines are especially preferable. As the mixing mass ratio of the polycarboxylic acid concrete admixture <1> and the antifoaming agent <2>, the antifoaming agent <2> is preferably 0.01 to 20% by mass relative to the polycarboxylic acid concrete admixture <1>. Meanwhile, the mixing mass ratio of the AE agent <3> is preferably 0.001 to 2% by mass relative to cement.

(3) Combination of <1> the polycarboxylic acid concrete admixture of the present invention and <2> a material segregation reducing agent as two essential constituents. Usable as the material segregation reducing agents are various thickening agents such as nonionic cellulose ethers, and compounds containing, as partial structures, a hydrophobic substituent comprising a hydrocarbon chain containing 4 to 30 carbon atoms and a polyoxyalkylene chain resulting from addition of 2 to 300 moles, on average, of an alkylene oxide(s) containing 2 to 18 carbon atoms, among others. The mixing mass ratio between the polycarboxylic acid concrete admixture <1> and the material segregation reducing agent <2> is preferably 10/90 to 99.99/0.01, and more preferably 50/50 to 99.9/0.1. Cement compositions containing this combination are suited for use as high flowing concrete, self-filling concrete and self-leveling compositions.

(4) Combination of <1> the polycarboxylic acid concrete admixture of the present invention and <2> a retarder as two essential constituents. Usable as the retarders are oxycarboxylic acids such as gluconic acid (salts) and citric acid (salts), saccharides such as glucose, sugar alcohols such as sorbitol, and phosphonic acids such as aminotri(methylenephosphonic acid), among others. Particularly preferred are oxycarboxylic acids. The mixing mass ratio between the polycarboxylic acid concrete admixture <1> and the retarder <2> is preferably 10/90 to 99.9/0.1, and more preferably 20/80 to 99/1.

(5) Combination of <1> the polycarboxylic acid concrete admixture of the present invention and <2> an accelerator as two essential constituents. Usable as the accelerators are soluble calcium salts such as calcium chloride, calcium nitrite and calcium nitrate, chlorides such as iron chloride and magnesium chloride, thiosulfate salts, formic acid, and formate salts such as calcium formate, among others. The mixing mass ratio between the polycarboxylic acid concrete admixture <1> and the accelerator <2> is preferably 0.1/99.9 to 90/10, and more preferably 1/99 to 70/30.

(6) Combination of <1> the polycarboxylic acid concrete admixture of the present invention and <2> a sulfonic acid (type) dispersant containing a sulfonic acid group in the molecule as two essential constituents. Usable as the sulfonic acid dispersants are ligninsulfonates, naphthalenesulfonic acid-formaline condensates, melaminesulfonic acid-formaline condensates, polystyrenesulfonic acid salts, aminoarylsulfonic acid-phenol-formaldehyde condensates, and the like. The mixing mass ratio between the polycarboxylic acid concrete admixture <1> and the sulfonic acid dispersant <2> is preferably 5/95 to 95/5, and more preferably 10/90 to 90/10.

The polycarboxylic acid concrete admixture of the present invention can suitably be applied to various cement compositions and the like and, in addition, can exhibit the properties such as decreasing the viscosity of cement compositions and the like, improvement of slump-retaining ability and suppression of bleeding water. Therefore, by using the polycarboxylic acid concrete admixture of the present invention, the water-reducing ability of the cement composition is improved, and the strength and durability of cured products obtained therefrom becomes excellent. Furthermore, it can provide such a level of viscosity as facilitating the works on the sites of handling them, whereby the working efficiency in constructing civil engineering and building structures is improved. Such cement composition containing the polycarboxylic acid concrete admixture of the present invention also constitutes the present invention.

The polycarboxylic acid concrete admixture of the present invention, which has the constitution mentioned above, can exhibit the properties such as decreasing the viscosity of cement compositions such as concrete, improvement of slump-retaining ability and suppression of bleeding water, thus can provide a cement composition with handling easiness on the sites of handling them, whereby the working efficiency in constructing civil engineering and building structures is improved.

BEST MODES FOR CARRYING OUT THE INVENTION

The following examples illustrate the present invention more specifically. They are, however, by no means limitative of the scope of the invention. In the examples, "%" represents "% by mass", unless otherwise specified.

Example 1

A glass-made reaction tank (content: 1 liter) equipped with a thermometer, stirrer, dropping funnel, nitrogen inlet tube and reflux condenser was charged with 377 g of water. The reaction vessel inside was purged with nitrogen under stirring, and heated to 70° C. in a nitrogen atmosphere. Then, to the reaction vessel, a mixed solution composed of 239 g of methoxypolyethylene glycol monomethacrylate (average molar number of addition of ethylene oxide 10), 64 g of methacrylic acid, 14 g of sodium methacrylate, 9 g of 3-mercaptopropionic acid and 92 g of deionized water was added dropwise over 5 hours. At the same time, an aqueous solution dissolving 5.1 g of a 30% hydrogen peroxide solution in 50 g of water and an aqueous solution dissolving 2.0 g of L-ascorbic acid in 50 g of water were added thereto dropwise over 6 hours. Further at the same time, dropping of 57 g of methyl methacrylate was started at a feed rate of 0.148 g/min. After the lapse of 235 minutes from starting the dropping, the feed rate of methyl methacrylate was changed to 0.344 g/min., and the dropping was completed in 5 hours.

After completion of the dropping, the reaction mixture was maintained at 70° C. for 1 hour. Moreover, the pH of this reaction mixture was adjusted to 7 with sodium hydroxide to obtain a polycarboxylic acid (P-1) of the present invention with a weight average molecular weight of 7700 as determined by gel permeation chromatography and expressed on the polyethylene glycol equivalent basis.

Example 2

A glass-made reaction tank (content: 0.5 liter) equipped with a thermometer, stirrer, dropping funnel, nitrogen inlet tube and reflux condenser was charged with 70 g of water. The reaction vessel inside was purged with nitrogen under stirring, and heated to 70° C. in a nitrogen atmosphere. Then, to the reaction vessel, a mixed solution composed of 121 g of methoxypolyethylene glycol monomethacrylate (average molar number of addition of ethylene oxide 6), 36 g of methacrylic acid, 4.3 g of 3-mercaptopropionic acid and 60 g of deionized water was added dropwise over 5 hours. At the same time, an aqueous solution dissolving 2.7 g of a 30% hydrogen peroxide solution in 30 g of water and an aqueous solution dissolving 1.0 g of L-ascorbic acid in 30 g of water were added dropwise over 6 hours. Further at the same time, 27.5 g of methyl methacrylate was added thereto dropwise in 5 hours. After completion of the dropping, the reaction mixture was maintained at 70° C. for 1 hour. Furthermore, the pH of this reaction mixture was adjusted to 7 with sodium hydroxide to obtain a polycarboxylic acid (P-2) of the present invention with a weight average molecular weight of 8900 as determined by gel permeation chromatography and expressed on the polyethylene glycol equivalent basis.

Example 3

A glass-made reaction tank (content: 0.5 liter) equipped with a thermometer, stirrer, dropping funnel, nitrogen inlet tube and reflux condenser was charged with 80 g of water. The reaction vessel inside was purged with nitrogen under stirring, and heated to 70° C. in a nitrogen atmosphere. Then, to the reaction vessel, a mixed solution composed of 109 g of methoxypolyethylene glycol monomethacrylate (average molar number of addition of ethylene oxide 25), 22 g of methacrylic acid, 18 g of methyl methacrylate, 1.7 g of 3-mercaptopropionic acid and 37 g of deionized water was added dropwise over 5 hours. At the same time, an aqueous solution dissolving 2.6 g of ammonium persulfate salt in 30 g of water was added dropwise over 6 hours. After completion of the dropping, the reaction mixture was maintained at 70° C. for 1 hour. Furthermore, the pH of this reaction mixture was adjusted to 7 with sodium hydroxide to obtain a polycarboxylic acid (P-3) of the present invention with a weight average molecular weight of 18000 as determined by gel permeation chromatography and expressed on the polyethylene glycol equivalent basis.

Comparative Example 1

A glass-made reaction tank (content: 1 liter) equipped with a thermometer, stirrer, dropping funnel, nitrogen inlet tube and reflux condenser was charged with 273 g of water. The reaction vessel inside was purged with nitrogen under stirring, and heated to 80° C. in a nitrogen atmosphere. Then, to the reaction vessel, a mixed solution composed of 375 g of methoxypolyethylene glycol monomethacrylate (average molar number of addition of ethylene oxide 25), 75 g of methacrylic acid, 3.3 g of 3-mercaptopropionic acid and 100 g of deionized water was added dropwise over 5 hours. At the same time, an aqueous solution dissolving 3 g of a 30% hydrogen peroxide solution in 50 g of water and an aqueous solution dissolving 1.2 g of L-ascorbic acid in 50 g of water were added dropwise over 6 hours. After completion of the dropping, the reaction mixture was maintained at 80° C. for 1 hour to obtain a comparative polycarboxylic acid (H-1) with a weight average molecular weight of 24000 as determined by gel permeation chromatography and expressed on the polyethylene glycol equivalent basis.

Examples 4 to 13, Comparative Examples 2 to 9

With the monomer compositions shown in Table 1 below, polycarboxylic acids (P-2) to (P-13) were obtained in the same manner as Example 1, and polycarboxylic acids (H-2) to (H-9) for comparison were obtained in the same manner as Comparative Example 1. The weight average molecular weights of the polycarboxylic acids (P-4) to (P-13) and (H-2) to (H-9) were measured by gel permeation chromatography in terms of polyethylene glycol are shown in Table 1.

TABLE 1

| | Polycarboxylic acid | Monomer composition (mole %) | Wight average molecular weight |
|---|---|---|---|
| Example 4 | P-4 | PGM-23E/MAA/EMA (17/57/26) | 12000 |
| Example 5 | P-5 | PGM-23E/MAA/IPMA (18/60/22) | 12000 |
| Example 6 | P-6 | PGM-23E/MAA/nBMA (20/60/20) | 12000 |
| Example 7 | P-7 | IPN-25/AA/BA (35/35/30) | 17000 |
| Example 8 | P-8 | IPN-25/AA/AM (15/30/55) | 18000 |
| Example 9 | P-9 | IPN-15/AA/AM (39/37/24) | 16000 |
| Example 10 | P-10 | IPN-25/AA/AM (21/59/20) | 14000 |
| Example 11 | P-11 | PGM-24E/AA/MMA (16/63/21) | 15000 |
| Example 12 | P-12 | PGM-10E/MAA/AM (39/40/21) | 18000 |
| Example 13 | P-13 | PGM-25E/MAA/AM (15/40/45) | 13000 |
| Compar. Ex. 2 | H-2 | PGM-23E/MAA/MMA (20/50/30) | 45000 |
| Compar. Ex. 3 | H-3 | PGM-23E/MAA/AM (22/66/12) | 15000 |
| Compar. Ex. 4 | H-4 | PGM-23E/MAA/EHM (5/25.6/69.4) | 11700 |
| Compar. Ex. 5 | H-5 | PGM-23E/MAA/MMA (20/50/30) | 24000 |
| Compar. Ex. 6 | H-6 | PGPh-10E/PEA-8/PEA-5/MAA/MA/MBS (11.35/2.38/10.54/45.2/22.7/7.83) | 16000 |
| Compar. Ex. 7 | H-7 | IPN-25/AA/BA (37.9/27.6/34.5) | 27000 |
| Compar. Ex. 8 | H-8 | PGM-28E/MAA/EA (20/60/20) | 36000 |
| Compar. Ex. 9 | H-9 | PGM-23E/MAA/MMA (15/15/70) | 15000 |

Production Examples 1 to 6

With the monomer compositions shown in Table 2 below, polycarboxylic acids (S-1) to (S-6) were obtained in the same manner as Comparative Example 1. The weight average molecular weights of the polycarboxylic acids (S-1) to (S-6) were measured by gel permeation chromatography in terms of polyethylene glycol are shown in Table 2.

TABLE 2

| | Polycarboxylic acid | Monomer composition (mole %) | Wight average molecular weight |
|---|---|---|---|
| Production Ex. 1 | S-1 | PGM-50E/MAA (19/81) | 21000 |
| Production Ex. 2 | S-2 | PGM-130E/MAA (15/85) | 40000 |
| Production Ex. 3 | S-3 | IPN-25/MA (33/67) | 25000 |
| Production Ex. 4 | S-4 | IPN-50/MA (33/67) | 28000 |
| Production Ex. 5 | S-5 | IPN-25/AA (24/76) | 27000 |
| Production Ex. 6 | S-6 | IPN-50/AA (20/80) | 27000 |

The descriptions in Table 1 and 2 are as follows.

PGM-130E, PGM-50E, PGM-28E, PGM-24E, PGM-10E: methoxypolyethylene glycol monomethacrylate (average molar number of addition of ethylene oxide is respectively 130, 50, 28, 24 and 10)

IPN-50, IPN-25, IPN-15: ethylene oxide adduct of 3-methyl-3-butene-1-ol (average molar number of addition of ethylene oxide is respectively 50, 25 and 15)

AM: methyl acrylate

MMA: methyl methacrylate

MAA: methacrylic acid

EMA: ethyl methacrylate

IPMA: isopropyl methacrylate nBMA: n-butyl methacrylate

BA: n-butyl acrylate

EA: ethyl acrylate

PHPh-10E: phenoxypolyethylene glycol monomethacrylate (average molar number of addition of ethylene oxide is respectively 8 and 5)

MA: maleic acid

MBS: methallyl benzenesulfonate

By a concrete test, the polycarboxylic acids obtained in Examples 1 to 3 and Comparative Examples 1 to 9 were evaluated as concrete admixtures. The results are shown in Table 3. Moreover, these polycarboxylic acids were mixed in mass rarios shown in Table 4, and the resultants were evaluated as concrete admixtures. The results are shown in Table 4. The concrete test conditions are as follows.

Concrete Test Conditions

Tap water: 172 kg/m³

Cement (product of Taiheiyo Cement Corporation): 491 kg/m³

Fine aggregate (pit sand produced from Ogasa yama): 744.5 kg/m³

Coarse aggregate (blend of crushed stones Nos. 5 and 6 with single grain size produced from Ome, mixing ratio 53/47): 909.8 kg/m³

The above materials were mixed with a pan mixer for 90 seconds.

The slump immediately after the mixing was measured by setting at 23.5 to 25 cm.

The amounts of addition (amounts of addition in terms of the solid matters) of the polycarboxylic acids obtained in Examples 1 to 3 and Comparative Examples 1 to 3 relative to 100% by mass of the solid matters of the cement were adjusted as shown in Table 3 and 4. The amount of addition shown in Examples a to h of Table 4 indicates the amount of addition (amount of addition in terms of solid matter) in the state that a polycarboxylic acid is mixed.

TABLE 3

| | Polycarboxylic acid | Amount of addition (% by mass) | Water-reducing ability | Slump-retaining ability | Concrete condition |
|---|---|---|---|---|---|
| Example A | P-1 | 0.60 | Δ | ◎ | ◎ |
| Example B | P-2 | 0.60 | Δ | ◎ | ◎ |
| Example C | P-3 | 0.30 | ○ | ○ | ○ |
| Example D | P-4 | 0.40 | ○ | ○ | ◎ |
| Example E | P-5 | 0.50 | Δ | ◎ | ◎ |
| Example F | P-6 | 0.60 | Δ | ◎ | ○ |
| Example G | P-7 | 0.50 | Δ | ◎ | ○ |
| Example H | P-8 | 0.70 | Δ | ◎ | ○ |
| Example I | P-9 | 0.40 | ○ | ○ | ◎ |
| Example J | P-10 | 0.30 | ○ | ○ | ○ |
| Example K | P-11 | 0.40 | ○ | ○ | ○ |
| Example L | P-12 | 0.40 | ○ | ○ | ○ |
| Example M | P-13 | 0.50 | Δ | ○ | ○ |
| Compar. Ex. A | H-1 | 0.20 | ◎ | X | X |
| Compar. Ex. B | H-2 | 0.30 | ○ | Δ | Δ |
| Compar. Ex. C | H-3 | 0.30 | ○ | Δ | Δ |
| Compar. Ex. D | H-4 | 0.90 | X | ○ | Δ |
| Compar. Ex. E | H-5 | 0.60 | Δ | ○ | X |
| Compar. Ex. F | H-6 | 0.90 | X | ○ | Δ |
| Compar. Ex. G | H-7 | 0.70 | Δ | ○ | X |
| Compar. Ex. H | H-8 | 0.60 | Δ | Δ | X |
| Compar. Ex. I | H-9 | 0.90 | X | Δ | Δ |

TABLE 4

| | Polycarboxylic acid (mass ratio) | Amount of addition (% by mass) | Water-reducing ability | Slump-retaining ability | Concrete condition |
|---|---|---|---|---|---|
| Example a | P-1/H-1 mixed (20/80) | 0.30 | ○ | ◎ | ◎ |
| Example b | P-1/H-1 mixed (50/50) | 0.25 | ○ | ◎ | ◎ |
| Example c | P-1/S-1 mixed (80/20) | 0.22 | ◎ | ◎ | ◎ |
| Example d | P-8/S-2 mixed (90/10) | 0.20 | ◎ | ◎ | ◎ |
| Example e | P-1/S-3 mixed (60/40) | 0.27 | ○ | ◎ | ◎ |
| Example f | P-1/S-4 mixed (70/30) | 0.26 | ○ | ◎ | ◎ |
| Example g | P-1/S-5 mixed (60/40) | 0.26 | ○ | ◎ | ◎ |
| Example h | P-1/S-6 mixed (75/25) | 0.23 | ◎ | ◎ | ◎ |
| Compar. Ex. a | H-1 | 0.20 | ◎ | X | X |
| Compar. Ex. b | H-2 | 0.30 | ○ | Δ | Δ |
| Compar. Ex. c | H-3 | 0.30 | ○ | Δ | Δ |
| Compar. Ex. d | S-1 | 0.18 | ◎ | X | X |
| Compar. Ex. e | S-2 | 0.16 | ◎ | X | X |
| Compar. Ex. f | S-3 | 0.23 | ◎ | X | Δ |
| Compar. Ex. g | S-4 | 0.22 | ◎ | X | X |
| Compar. Ex. h | S-5 | 0.22 | ◎ | X | Δ |
| Compar. Ex. i | S-6 | 0.20 | ◎ | X | X |

In Table 3 and 4, various properties were evaluated as follows.

The water-reducing ability was compared for an amount required for providing the predetermined slump value. Those requiring a small amount of addition were evaluated as good in water-reducing ability, and those requiring a large amount of addition were evaluated as poor in water-reducing ability. Specifically, it was evaluated as the following criteria.

◎: Less than 0.25 (% by mass) of the amount of addition

○: Not less than 0.25 (% by mass) and less than 0.40 (% by mass) of the amount of addition Δ: Not less than 0.40 (% by mass) and less than 0.80 (% by mass) of the amount of addition x: Not less than 0.80 (% by mass) of the amount of addition The slump-retaining ability was compared for ratios after the lapse of 60 minutes relative to the initial slump value. Those with high ratios were evaluated as good in slump-retaining ability, and those with low ratios were evaluated as poor in slump-retaining ability. Specifically, it was evaluated as the following criteria.

◎: The slump value after the lapse of 60 minutes being not less than 80% relative to the initial slump value ○: The slump value after the lapse of 60 minutes being not less than 70% and less than 80% relative to the initial slump value Δ: The slump value after the lapse of 60 minutes being not less than 60% and less than 70% relative to the initial slump value x: The slump value after the lapse of 60 minutes being less than 60% relative to the initial slump value The concrete condition was evaluated as follows. Those high in concrete viscosity when mixed with a scoop and with a large amount of adhesion of mortar to the scoop are poor in concrete condition. As the concrete viscosity becomes lower and the adhesion of mortar becomes smaller, the concrete condition becomes better. Specifically, it was evaluated as the following criteria.

⊚: Low in concrete viscosity when mixed, and there is almost no adhesion of mortar to a scoop ○: Low in concrete viscosity when mixed, but there is adhesion of mortar to a scoop Δ: High in concrete viscosity when mixed, and also there is adhesion of mortar to a scoop x: High in concrete viscosity when mixed, and there is a large amount of adhesion of mortar to a scoop As shown in Table 3, Comparative Example A using the polycarboxylic acid (H-1) is excellent in the water-reducing ability, but remarkably poor in the slump-retaining ability and concrete condition. Comparative Example C using the polycarboxylic acid (H-2) and Comparative Example D using the polycarboxylic acid (H-3) are good in the water-reducing ability, but poor in the slump-retaining ability and concrete condition. Comparative Example D using the polycarboxylic acid (H-4), Comparative Example F using the polycarboxylic acid (H-6), and Comparative Example I using the polycarboxylic acid (H-9) are good in the retaining ability, but remarkably poor in the water-reducing ability. Comparative Example E using the polycarboxylic acid (H-5), Comparative Example G using the polycarboxylic acid (H-7), and Comparative Example H using the polycarboxylic acid (H-8) are remarkably poor in the concrete condition.

Meanwhile, Examples A to M using the polycarboxylic acids (P-1) to (H-13) are good in all of the water-reducing ability, retaining ability and condition.

Furthermore, as shown in Table 4, Comparative Examples a to i using the polycarboxylic acids (H-1), (H-2), (H-3), (S-1), (S-2), (S-3), (S-4), (S-5) and (S-6) are excellent in the water-reducing ability, but poor in the slump-retaining ability and concrete condition.

Meanwhile, Examples a to h mixing the polycarboxylic acids (P-1) or (P-8) of the present invention are improved in the slump-retaining ability and concrete condition while maintaining the water-reducing ability.

The present application claims priority under 35 U.S.C. § 119 to Japanese Patent Application No. 2003-132287, filed May 9, 2003, entitled "POLYCARBOXYLIC ACID CONCRETE ADMIXTURE". The content of this application is incorporated herein by reference in their entirety.

The invention claimed is:

1. A polycarboxylic acid concrete admixture comprising a polycarboxylic acid polymer containing a polyalkylene glycol in the side chain,
wherein said polycarboxylic acid polymer is formed by polymerizing monomer components comprising 22 to 55 mole % of at least one alkyl (meth)acrylate monomer selected from the group consisting of methyl (meth)acrylate, ethyl (meth)acrylate, propyl (meth)acrylate and butyl (meth)acrylate, 15 to 40 mole % of a polyalkylene glycol unsaturated monomer represented by the following formula (1);

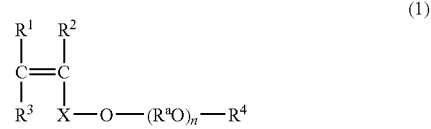

wherein $R^1$, $R^2$ and $R^3$ may be the same or different and each represents a hydrogen atom or a methyl group; $R^4$ represents a hydrogen atom or a C1 to C20 saturated alkyl group or a C1 to C20 unsaturated alkyl group; $R^a$ may be the same or different and represents an alkylene group containing 2 to 18 carbon atoms; n represents an average molar number of addition of the oxyalkylene group represented by $R^aO$ and is a number of 2 to 25; X represents a divalent alkylene group containing 1 to 5 carbon atoms or represents that the carbon atom and oxygen atom bonded to X are directly bonded to each other in case of the group represented by $R^1R^3C=CR^2X—$ is a vinyl group, and X may be a —CO— bond, and 19 to 65 mole % of an unsaturated carboxylic acid (salt) monomer, and
has a weight average molecular weight of 18000 or less.

2. The polycarboxylic acid concrete admixture according to claim 1,
which comprises the polycarboxylic acid polymer according to claim 1 and another polycarboxylic acid polymer differing from said polymer.

3. The polycarboxylic acid concrete admixture according to claim 2,
wherein the mixing mass ratio of the polycarboxylic acid polymer according to claim 1 and another polycarboxylic acid polymer differing from said polymer is 5 to 95:95 to 5.

4. A cement composition
which comprises the polycarboxylic acid concrete admixture according to claim 1.

5. A cement composition
which comprises the polycarboxylic acid concrete admixture according to claim 2.

6. A cement composition
which comprises the polycarboxylic acid concrete admixture according to claim 3.

7. The polycarboxylic acid concrete admixture
according to claim 2,
wherein said another polycarboxylic acid polymer differing from said polymer is at least one copolymer selected from the group consisting of a copolymer (D), a copolymer (E) and a copolymer (F);
wherein the copolymer (D) is a copolymer containing a constituent unit derived from a (poly)alkylene glycol mono (meth) acrylic acid ester monomer and a constituent unit derived from an unsaturated monocarboxylic acid monomer;
the copolymer (E) is a copolymer containing a constituent unit derived from an unsaturated (poly)alkylene glycol ether monomer and a constituent unit derived from a maleic acid monomer; and
the copolymer (F) is a copolymer containing a constituent unit derived from an unsaturated (poly)alkylene glycol ether monomer and a constituent unit derived from an unsaturated monocarboxylic acid monomer.

8. The polycarboxylic acid concrete admixture according to claim 3, wherein said another polycarboxylic acid polymer differing from said polymer is at least one copolymer selected from the group consisting of a copolymer (D), a copolymer (E) and a copolymer (F);

wherein the copolymer (D) is a copolymer containing a constituent unit derived from a (poly)alkylene glycol mono (meth) acrylic acid ester monomer and a constituent unit derived from an unsaturated monocarboxylic acid monomer;

the copolymer (E) is a copolymer containing a constituent unit derived from an unsaturated (poly)alkylene glycol ether monomer and a constituent unit derived from a maleic acid monomer; and the copolymer (F) is a copolymer containing a constituent unit derived from an unsaturated (poly)alkylene glycol ether monomer and a constituent unit derived from an unsaturated monocarboxylic acid monomer.

9. A cement composition which comprises the polycarboxylic acid concrete admixture according to claim 7.

10. A cement composition which comprises the polycarboxylic acid concrete admixture according to claim 8.

\* \* \* \* \*